United States Patent
Viavattine et al.

(10) Patent No.: US 8,832,914 B2
(45) Date of Patent: Sep. 16, 2014

(54) COILING DEVICE FOR MAKING AN ELECTRODE ASSEMBLY AND METHODS OF USE

(75) Inventors: Joseph J. Viavattine, Vadnais Heights, MN (US); Paul B. Aamodt, Minnetonka, MN (US); Sandeep Saurkar, St. Louis Park, MN (US); Dona M. Suardini, Plymouth, MN (US); Brent J. Torgerson, Stillwater, MN (US)

(73) Assignee: Medtronic, Inc, Minneapolis, MN (US)

( * ) Notice: Subject to any disclaimer, the term of this patent is extended or adjusted under 35 U.S.C. 154(b) by 316 days.

(21) Appl. No.: 13/230,240

(22) Filed: Sep. 12, 2011

(65) Prior Publication Data

US 2012/0084979 A1   Apr. 12, 2012

Related U.S. Application Data

(60) Provisional application No. 61/390,431, filed on Oct. 6, 2010.

(51) Int. Cl.
| | |
|---|---|
| *B23P 13/00* | (2006.01) |
| *H01M 2/26* | (2006.01) |
| *H01M 10/04* | (2006.01) |
| *H01M 10/0525* | (2010.01) |
| *H01M 2/30* | (2006.01) |

(52) U.S. Cl.
CPC ............ *H01M 2/26* (2013.01); *H01M 10/0525* (2013.01); *H01M 2/305* (2013.01); *H01M 10/0409* (2013.01); *Y02E 60/12* (2013.01)
USPC ..................................... 29/2; 29/825; 29/874

(58) Field of Classification Search
USPC ................................................ 29/2, 825, 874
See application file for complete search history.

(56) References Cited

U.S. PATENT DOCUMENTS

| 1,861,006 A | 5/1932 | Goodman |
|---|---|---|
| 3,153,180 A | 10/1964 | Bellmore |

(Continued)

FOREIGN PATENT DOCUMENTS

| DE | 26 45 863 | 4/1977 |
|---|---|---|
| EP | 1 357 619 | 10/2003 |

(Continued)

OTHER PUBLICATIONS

International Search Report PCT/US2011/029322 (3 pgs.).

(Continued)

*Primary Examiner* — Carl Arbes

(57) ABSTRACT

A system for the automated coiling of a jelly roll electrode assembly for controlled assembly and tensioning of jelly roll assembly is provided. The system includes: a shuttle, and a mandrel to which electrodes are welded; a base, mateable with the shuttle and on which the battery head assembly is mounted for welding to the mandrel; and a coiling device. The coiling device has an upper spool, a lower spool, holding a separator strip and a platform between the two holding the base. The separator strip is threaded through a passage in the mandrel separating positive and negative portions. Rotating the mandrel coils the positive electrode, the separator strip and the negative electrode to coil around the mandrel. The coiling device may include a feedback loop braking one or both spools and allowing the coiling tension to be programmed to a desired level.

15 Claims, 19 Drawing Sheets

(56) References Cited

U.S. PATENT DOCUMENTS

| | | | |
|---|---|---|---|
| 3,615,834 A | 10/1971 | Sundberg | |
| 3,734,778 A | 5/1973 | Huf et al. | |
| 3,791,868 A | 2/1974 | Compton et al. | |
| 4,028,138 A | 6/1977 | Dey | |
| 4,063,978 A * | 12/1977 | Badger et al. | 156/82 |
| 4,064,725 A | 12/1977 | Hug et al. | |
| 4,080,727 A * | 3/1978 | Stolle et al. | 29/623.4 |
| 4,092,386 A | 5/1978 | Rigstad | |
| 4,099,401 A | 7/1978 | Hug et al. | |
| 4,158,300 A | 6/1979 | Hug et al. | |
| 4,212,179 A | 7/1980 | Juergens | |
| 4,332,868 A | 6/1982 | Anand et al. | |
| 4,476,624 A | 10/1984 | Klein et al. | |
| 4,559,700 A * | 12/1985 | Sugalski et al. | 29/623.1 |
| 4,863,815 A | 9/1989 | Chang et al. | |
| 4,879,190 A | 11/1989 | Lundsgaard | |
| 4,930,327 A | 6/1990 | Aidlin et al. | |
| 4,966,822 A | 10/1990 | Johnston | |
| 4,975,095 A | 12/1990 | Strickland et al. | |
| 5,045,086 A | 9/1991 | Juergens | |
| 5,047,068 A | 9/1991 | Stoklosa | |
| 5,323,527 A | 6/1994 | Ribordy et al. | |
| 5,326,652 A | 7/1994 | Lake | |
| 5,486,215 A | 1/1996 | Kelm et al. | |
| 5,509,942 A | 4/1996 | Dodge | |
| 5,521,021 A | 5/1996 | Alexandres et al. | |
| 5,532,075 A | 7/1996 | Alexandres et al. | |
| 5,549,717 A | 8/1996 | Takeuchi et al. | |
| 5,603,737 A | 2/1997 | Marincic et al. | |
| 5,677,078 A | 10/1997 | Juergens et al. | |
| 5,700,299 A | 12/1997 | Clark | |
| 5,791,041 A | 8/1998 | Miyata et al. | |
| 6,051,038 A | 4/2000 | Howard et al. | |
| 6,190,426 B1 | 2/2001 | Thibault et al. | |
| 6,391,068 B2 | 5/2002 | Yoshida et al. | |
| 6,420,065 B1 | 7/2002 | Yde-Andersen et al. | |
| 6,443,999 B1 | 9/2002 | Cantave et al. | |
| 6,485,859 B1 | 11/2002 | Szyszkowski | |
| 6,627,344 B2 | 9/2003 | Kang et al. | |
| 6,670,071 B2 | 12/2003 | Skinlo et al. | |
| 6,692,542 B1 | 2/2004 | Kashiyama et al. | |
| 6,841,296 B2 | 1/2005 | Ng et al. | |
| 6,923,837 B2 | 8/2005 | Longhi, Jr. et al. | |
| 6,951,576 B1 | 10/2005 | Takeuchi | |
| 7,041,413 B2 | 5/2006 | Tsukamoto et al. | |
| 7,060,387 B2 | 6/2006 | Kim et al. | |
| 7,070,881 B2 | 7/2006 | Kishiyama et al. | |
| 7,205,068 B2 | 4/2007 | Fong et al. | |
| 7,378,181 B2 | 5/2008 | Skinlo | |
| 7,410,512 B2 | 8/2008 | Tsukamoto et al. | |
| 7,416,811 B2 | 8/2008 | Nakahara et al. | |
| 7,432,012 B2 | 10/2008 | Tsukamoto et al. | |
| 7,435,507 B2 | 10/2008 | Ohata et al. | |
| 7,442,465 B2 | 10/2008 | Kim et al. | |
| 7,481,852 B2 | 1/2009 | Longhi, Jr. et al. | |
| 7,488,553 B2 | 2/2009 | Tsukamoto et al. | |
| 7,501,201 B2 | 3/2009 | Ishikawa et al. | |
| 7,569,305 B2 | 8/2009 | Skinlo et al. | |
| 7,578,898 B2 | 8/2009 | Le Gal | |
| 7,601,461 B2 | 10/2009 | Skinlo et al. | |
| 7,632,603 B2 | 12/2009 | Tsukamoto et al. | |
| 7,666,545 B2 | 2/2010 | Oh et al. | |
| 7,879,486 B2 | 2/2011 | Tsukamoto et al. | |
| 2002/0007552 A1 * | 1/2002 | Singleton et al. | 29/623.3 |
| 2002/0020055 A1 * | 2/2002 | Schwetz et al. | 29/730 |
| 2003/0003356 A1 | 1/2003 | Tsukamoto et al. | |
| 2004/0049908 A1 | 3/2004 | Tsukamoto et al. | |
| 2004/0053115 A1 | 3/2004 | Skinlo | |
| 2004/0053116 A1 | 3/2004 | Skinlo | |
| 2004/0053118 A1 | 3/2004 | Tsukamoto et al. | |
| 2004/0053119 A1 | 3/2004 | Tsukamoto et al. | |
| 2004/0107564 A1 * | 6/2004 | Kurimoto et al. | 29/623.3 |
| 2004/0142237 A1 | 7/2004 | Asano | |
| 2004/0214076 A1 | 10/2004 | Tsukamoto et al. | |
| 2005/0042516 A1 | 2/2005 | Oh et al. | |
| 2005/0123824 A1 | 6/2005 | Ishikawa et al. | |
| 2005/0174092 A1 | 8/2005 | Dougherty et al. | |
| 2006/0035147 A1 | 2/2006 | Lam et al. | |
| 2006/0073380 A1 | 4/2006 | Kim et al. | |
| 2006/0085971 A1 | 4/2006 | Andrews et al. | |
| 2006/0123622 A1 | 6/2006 | Guy | |
| 2006/0222943 A1 | 10/2006 | Fujikawa et al. | |
| 2006/0263686 A1 | 11/2006 | Zhao | |
| 2007/0059590 A1 | 3/2007 | Hayashi et al. | |
| 2007/0059599 A1 | 3/2007 | Rubino et al. | |
| 2007/0138905 A1 | 6/2007 | Axelrod et al. | |
| 2007/0180686 A1 | 8/2007 | Woo | |
| 2008/0026283 A1 | 1/2008 | Park et al. | |
| 2008/0026293 A1 | 1/2008 | Marple et al. | |
| 2008/0138699 A1 | 6/2008 | Kim et al. | |
| 2008/0248375 A1 | 10/2008 | Cintra et al. | |
| 2009/0208832 A1 | 8/2009 | Beard | |
| 2010/0273036 A1 | 10/2010 | Marple et al. | |

FOREIGN PATENT DOCUMENTS

| | | |
|---|---|---|
| JP | 8 050915 | 2/1996 |
| JP | 9 120822 | 5/1997 |
| JP | 2000 348754 | 12/2000 |
| WO | WO 90/16089 | 12/1990 |
| WO | 2008/018207 | 2/2008 |

OTHER PUBLICATIONS

International Search Report PCT/US2011/029320 (3 pgs.).
International Search Report PCT/US2011/029323 (3 pgs.).
International Search Report PCT/US2011/029325 (3 pgs.).
International Search Report PCT/US2011/051685 (4 pgs.).
International Search Report PCT/US2011/051687 (4 pgs.).

* cited by examiner

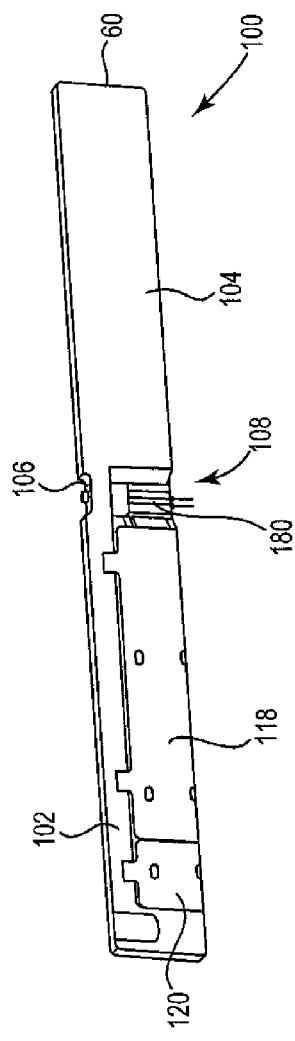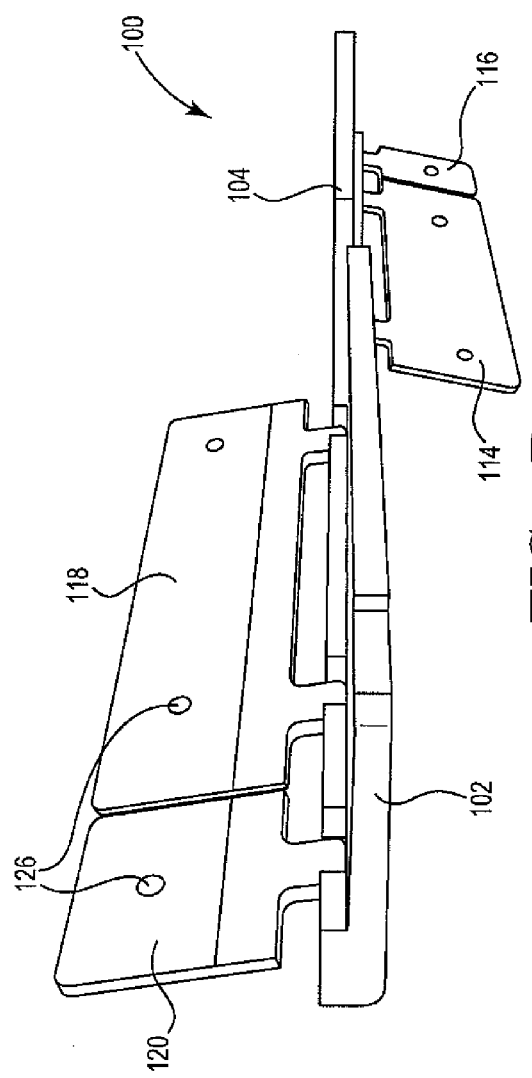
FIG. 3A
FIG. 3B

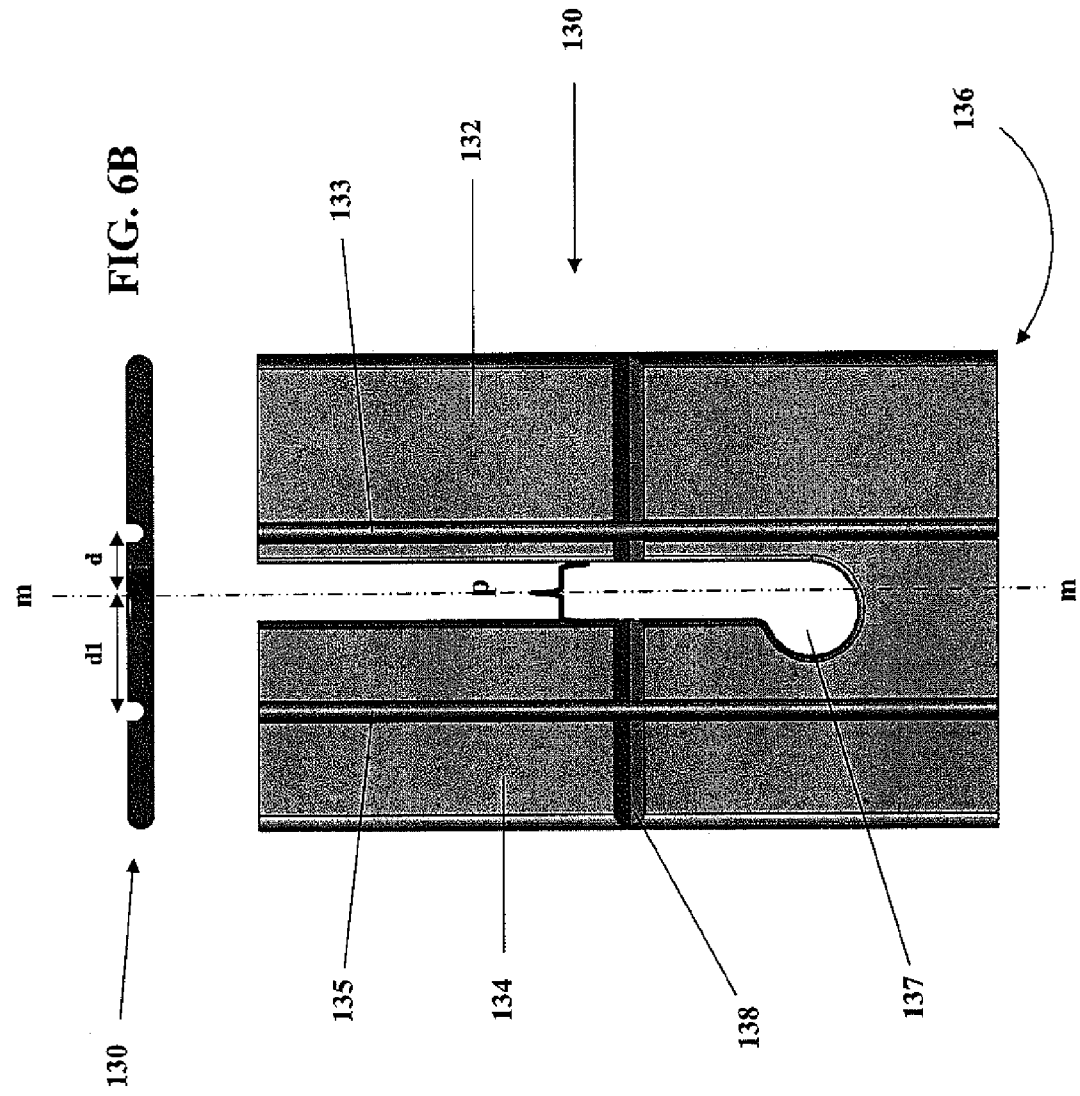

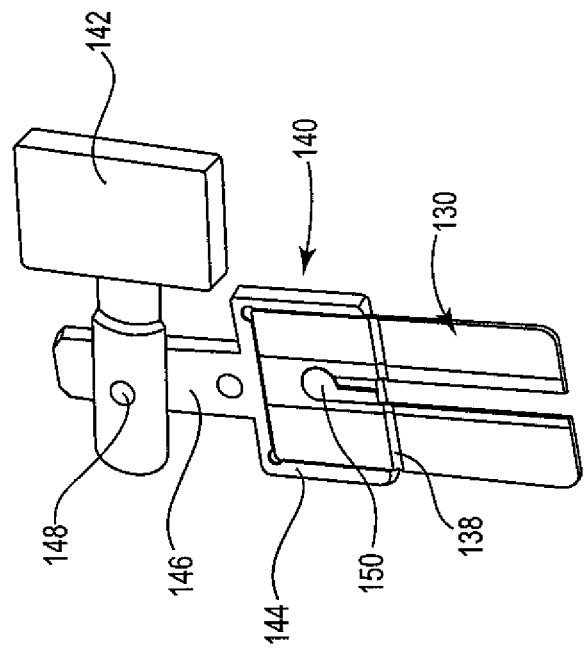
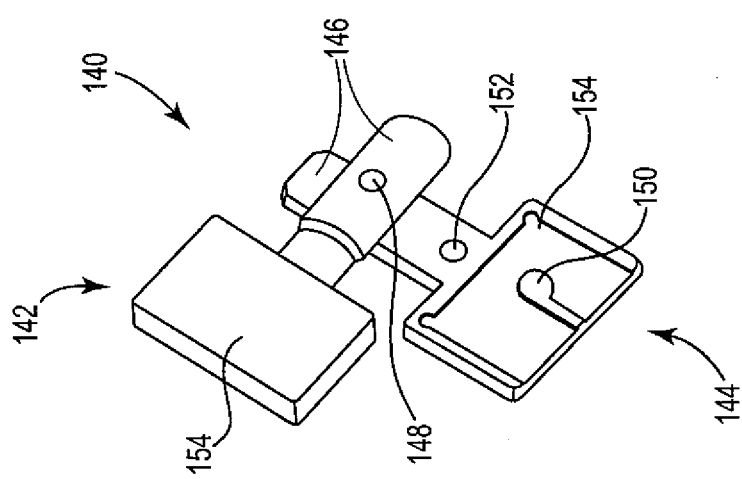
FIG. 8
FIG. 7

COILING DEVICE FOR MAKING AN ELECTRODE ASSEMBLY AND METHODS OF USE

CROSS REFERENCE TO RELATED APPLICATIONS

This application claims benefit under 35 U.S.C. §119(e) to U.S. Provisional Patent Application Ser. No. 61/390,431, filed Oct. 6, 2010, the contents of which is incorporated herein by reference in its entirety.

FIELD OF THE INVENTION

The invention relates to an automated battery assembly system utilizing a mandrel that allows for increased compactness and reproducibility.

BACKGROUND OF THE INVENTION

Batteries for medical devices have demanding requirements. They should be small, have a long life, high power output, low self-discharge rate, compact size and high reliability. The need for miniaturization while maintaining or increasing output means that as much of the battery footprint as possible should be used for power storage resulting in the concomitant elimination of dead space. However, while the elimination of dead space should result in greater miniaturization, it also results in a greater difficulty of assembly due to the increasingly small size of the component parts.

Traditionally, jelly roll type batteries have been made by using a mandrel to wrap electrodes around. Once wrapped, the mandrel is removed providing a jelly roll wrapped electrode assembly for use in a battery. However, removal of the mandrel from the core of the jelly roll inherently presents the potential of damaging the jelly roll due to the possibility of pulling the core of the jelly roll out with the mandrel. Therefore, the jelly roll should not be wrapped tight to avoid this problem. Conversely, a loosely wrapped jelly roll wastes space and decreases battery capacity and power due to size constraints. More recently, jelly roll storage batteries have been made using a rod-shaped, non-conductive, non-deformable core around which electrodes are wrapped. Conductive tabs are added to each electrode to complete the circuit.

U.S. Pat. No. 7,442,465 to Kim et al., discloses a rechargeable battery which has a non-deformation core. Once the positive and negative electrodes are wound around the core, conductive tabs are attached to the electrodes and the core serves to prevent deformation of the jelly roll, but does not conduct current.

U.S. provisional patent application 60/348,665 to Nakahara et al. describes a feedthrough pin that is directly connected to an inner end of an electrode. The pin extends from the jelly roll and through the battery case and functions as a battery terminal. The feedthrough pin fits into a slotted 'C'-shaped mandrel. The positive electrode is conductively connected to the pin which fits within the 'C'-shaped mandrel. As the positive electrode is wound, a separator is inserted between the feedthrough pin/mandrel and the positive electrode. A negative electrode is inserted between the separator and the pin/mandrel. The separator and negative electrode are held in the jelly roll by the tension created between the feedthrough pin/mandrel and the positive electrode. After winding, a metal tab is welded to the negative electrode and the tab contacts the battery case endcap to complete the circuit.

Oftentimes the coiling of the jelly roll can be complicated by telescoping of the coil, making the process inefficient. In other instances, the jelly roll cannot be used due to deformation or tearing of the roll occurring during the coiling process.

Therefore, a need still exists for improved methods to coil jelly roll assemblies.

BRIEF SUMMARY OF THE INVENTION

The present invention provides a device for the automated coiling of a jelly roll electrode assembly. Advantages of the device include controlled and consistent tension of the coiled jelly roll assembly during fabrication. The device provides a coiling device that includes a winding apparatus, an upper spool and a lower spool holding a separator strip and a platform that can hold a base and shuttle which in turn supports a battery mandrel. The base, shuttle and mandrel are placed on the platform which is located between the upper and lower spools.

The mandrel is conductively connected to positive and negative electrodes with the separator strip threaded through a passage (e.g., an opening) in the mandrel separating positive and negative portions of the mandrel. Upon rotating the mandrel with the winding apparatus, the positive electrode, the separator strip and the negative electrode are coiled around the mandrel providing a jelly roll electrode assembly.

The device can also include a feedback loop between a brake on one or both spools and the winding apparatus to allow tensioning of the winding apparatus to be programmed to a desired level.

In one embodiment, the invention provides an apparatus to hold a battery mandrel for jelly roll fabrication. The apparatus includes a base and a shuttle. The base includes a right member and a left member connected by a central member wherein the central member is configured to accept an electrode assembly head piece (electrode assembly header) for a battery. The shuttle, includes a right portion and a left portion connected by a center portion. The left portion includes a cover, the right portion includes a cover, and the center portion is configured to accept the mandrel. The left and right covers are positioned on opposite sides of the shuttle. The base is configured to mate with the shuttle, such that the mandrel is secured between the center portion of the shuttle and central member of the base.

In another aspect, the invention includes a coiling device for preparing an electrode assembly. The coiling device includes: a) a winding apparatus; b) a platform on the coiling device configured to hold an unwound battery assembly, including a battery mandrel; c) a first spool, wherein the first spool provides a separator strip; d) a second spool, wherein the second spool accepts the separator strip; and e) one or more heating elements.

The invention also provides a method of making an electrode assembly. The method includes providing the battery mandrel having a positive portion, a negative portion and a removable portion connecting the positive portion to the negative portion. A passage is included between the positive portion and the negative portion of the mandrel. A ligature is provided to hold the battery mandrel. The ligature is configured, at a first end to secure the removable portion of the battery mandrel. The method also provides passing a stem on a second end of the ligature through a drive hole in a shuttle, the shuttle comprising a right portion and a left portion connected by a center portion.

A positive electrode is disposed in the right portion of the shuttle so that an end of the electrode contacts a positive portion of the mandrel. A negative electrode is disposed in the left portion of the shuttle so that an end of the negative electrode contacts a negative portion of the mandrel. The positive electrode and the negative electrode are welded, respectively, to the positive portion of the mandrel and the negative portion of the mandrel. The method also includes a base having a central member with a rotating assembly. An electrode assembly header is placed in a drive barrel which includes a drive stem configured to mate with the rotating assembly of the base. The shuttle is mated with the base and the head piece is welded to the mandrel. The base is mounted on a coiling device such that the stem of the ligature is connected to a winding apparatus. A separator strip is passed through the passage between the positive portion of the mandrel and the negative portion of the mandrel. The mandrel is rotated such that the positive electrode, separator strip and negative electrode are coiled around the mandrel to form a jelly roll. An exposed end of the separator strip is affixed to an outer layer of separator strip of the jelly roll such that the coil is sealed. A coiled jelly roll electrode assembly is thereby provided.

While multiple embodiments are disclosed, still other embodiments of the present invention will become apparent to those skilled in the art from the following detailed description. As will be apparent, the invention is capable of modifications in various obvious aspects, all without departing from the spirit and scope of the present invention. Accordingly, the detailed descriptions are to be regarded as illustrative in nature and not restrictive.

BRIEF DESCRIPTION OF THE DRAWINGS

FIGS. 3A and 3B illustrate two different views of a shuttle useful in holding the battery assembly for winding and configured to fit into the base piece illustrated in FIG. 2.

FIGS. 6A and 6B illustrate a mandrel according to one embodiment of the invention. FIG. 6A is a side-plan view of the mandrel. FIG. 6B is a top-plan view of the mandrel of FIG. 6A.

FIG. 7 illustrates a ligature used to secure a mandrel into the shuttle illustrated in FIG. 5.

FIG. 8 illustrates the mandrel being fitted into the ligature shown in FIG. 7.

DETAILED DESCRIPTION OF THE EXEMPLARY EMBODIMENTS

In General

Figure 1:
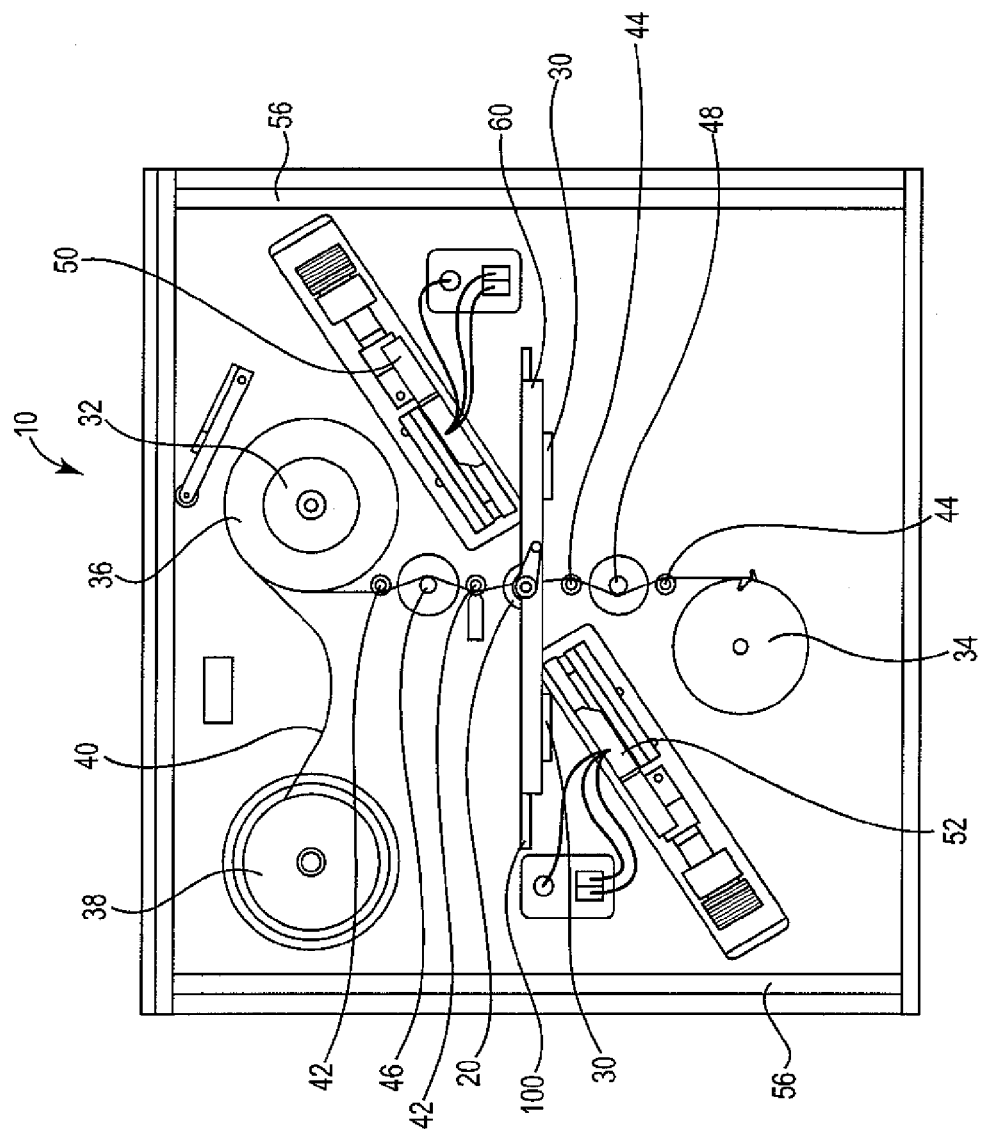
FIG. 1 is a schematic diagram of one exemplary embodiment of a coiling device according to the invention. The coiling device allows for the automated wrapping of the battery electrodes and separator strip around a mandrel.

In the specification and in the claims, the terms "including" and "comprising" are open-ended terms and should be interpreted to mean "including, but not limited to . . . ." These terms encompass the more restrictive terms "consisting essentially of" and "consisting of."

It must be noted that as used herein and in the appended claims, the singular forms "a", "an" and "the" include plural reference unless the context clearly dictates otherwise. As well, the terms "a" (or "an"), "one or more" and "at least one" can be used interchangeably herein. It is also to be noted that the terms "comprising", "including", "characterized by" and "having" can be used interchangeably.

Unless defined otherwise, all technical and scientific terms used herein have the same meanings as commonly understood by one of ordinary skill in the art to which this invention belongs. All publications and patents specifically mentioned herein are incorporated by reference in their entirety for all purposes including describing and disclosing the chemicals, instruments, statistical analyses and methodologies which are reported in the publications which might be used in connection with the invention. All references cited in this specification are to be taken as indicative of the level of skill in the art. Nothing herein is to be construed as an admission that the invention is not entitled to antedate such disclosure by virtue of prior invention.

As used herein, the term "mandrel" means an interior core at least a portion of which can be an integral part of the electrode assembly. The term "interconnect joint" refers to a conductive connection between the electrical components of a battery including a mandrel. While the mandrel may, itself not be conductive, those parts of the electrode assembly required for an electric current, including, at least, positive and negative electrodes and positive and negative feedthrough pins are conductively connected on the mandrel. In addition, the term "electrode" is used to refer to an electrode substrate that can be coated with an active material. The electrode can include a current collecting substrate in the form of multiple "plates" or panels conductively connected to each other. Alternatively, the electrode comprises a substrate in the form of a strip of thin conductive material such as a foil. When the electrode is formed using a foil or thin conductive strip as a substrate, the electrode can be considered an "electrode strip".

As used herein the terms "heat sealed" and "heat sealer" refer to conventional methods known in the art in which a machine applies heat to seal a material such as a thermoplastic material. Of the several types of heat sealers, one is a continuous heat sealer that applies a continuous heat. A continuous heat device or sealer can be constructed using a cartridge heater that is inserted into an appropriate size opening in a block, such as metal or ceramic, having a predetermined shape and desirable thermal properties. A second type of heat sealer is an impulse heat sealer. Generally, an impulse heat sealer uses a stationary element (such as a nichrome wire) that is heated by passing a current through it for a period of time.

The invention will be further described with reference to the following non-limiting embodiments. It will be apparent to those skilled in the art that many changes can be made in the embodiments described without departing from the scope of the present invention. Thus the scope of the present invention should not be limited to the embodiments described in this application, but only by embodiments described by the language of the claims and the equivalents of those embodiments. Unless otherwise indicated, all percentages are by weight.

The Invention

The present invention provides a device for the automated coiling of a jelly roll electrode assembly. Advantages of the present invention include a controlled and consistent tension of the coiled jelly roll assembly during winding. The system provides a coiling device that includes a winding apparatus, an upper spool and a lower spool holding a separator strip and a platform holding a base and shuttle that support a battery mandrel. The mandrel is conductively connected to positive and negative electrodes with the separator strip threaded through a passage in the mandrel separating positive and negative portions connected by a removable portion. The positive electrode, the separator strip and the negative electrode are coiled around the mandrel when the mandrel is rotated to provide a jelly roll electrode assembly. The device also includes a feedback loop between a brake on one or both spools and the winding apparatus to allow the tension of the winding apparatus to be programmed to a desired level.

The present invention provides a device and process for the assembly and automated coiling of a jelly roll electrode assembly providing for controlled and consistent tension of the coiled jelly roll assembly. The system includes a shuttle configured to hold a mandrel with positive and negative electrodes attached to the mandrel. The system also includes a base piece that is mateable with the shuttle and holds a electrode assembly header. The electrode assembly header comprises the battery cover and positive and negative feedthrough pins. Once the shuttle is mated with the base piece, the feedthrough pins are welded to the positive and negative portions of the mandrel. The system further provides a coiling device on which the mandrel assembly is mounted. The coiling device includes a winding apparatus, an upper spool and a lower spool holding a separator strip and a coiler platform holding the base and shuttle that contain the mandrel assembly. Docking of the base/shuttle with the coiler platform engages a ligature holding a bottom portion of the mandrel with a drive shaft on the coiler and a secondary drive shaft in the base piece that, connected by a drive belt, engages a rotating portion of the base holding the electrode assembly header on the mandrel. The separator strip is threaded through a passage in the mandrel separating the positive and negative portions of the mandrel. Rotation of the mandrel causes the positive electrode, the separator strip and the negative electrode to coil around the mandrel to provide a jelly roll electrode assembly. The coiling device also includes a feedback loop between a brake on one or both spools and the winding apparatus allowing the tension of the winding apparatus to be programmed to a desired level.

Referring now to FIG. 1, a coiling device 10 according to the invention is illustrated. The coiling device comprises a winding apparatus 20 and a platform 30 configured to hold a base piece 60 and shuttle 100. Base piece 60 and shuttle 100 are adapted to hold a mandrel (not shown) used in making a jelly roll electrode assembly. Also shown are a first spool 32 and a second spool 34 used to provide and hold a separator strip 36 used in making the jelly roll electrode assembly. The separator strip generally has a backing 40. Backing 40 is taken up on an uptake spool 38 when the separator strip is unwound.

In one aspect, the base/shuttle 60/100 assembly is fitted onto platform 30 and separator strip 36 is threaded around upper guide rollers 42 and a tension roller 46 through a passage in the mandrel around lower guide rollers 44 and a lower tension roller 48 and wound onto the second spool 34. The coiling device 10 can also include upper and/or lower heating elements 50 and 52. When the jelly roll assembly is coiled, the heating elements cut separator strip 36 and seal an outer layer of separator strip 36 to itself, sealing the jelly roll electrode assembly 200 (not shown). Also illustrated is a light curtain 56, that provides a safety feature and can be used to stop the automated coiling process should the plane of the light curtain be broken by any object.

Light curtain 56 provides an alternative to a mechanical barrier in guarding the operation of the winder and providing a safety mechanism for users. Light curtain 56 is positioned about the perimeter of coiling device 10. Light curtain 56 is an optoelectronic device that includes two members. One member is a transmitter and the other member is a receiver. The transmitter projects an array of parallel infrared light beams to the receiver which consists of a number of photoelectric cells. When an object breaks one or more of the beams a stop signal is sent to the coiler and to resume operation, the coiler must be re-started.

Figure 2:
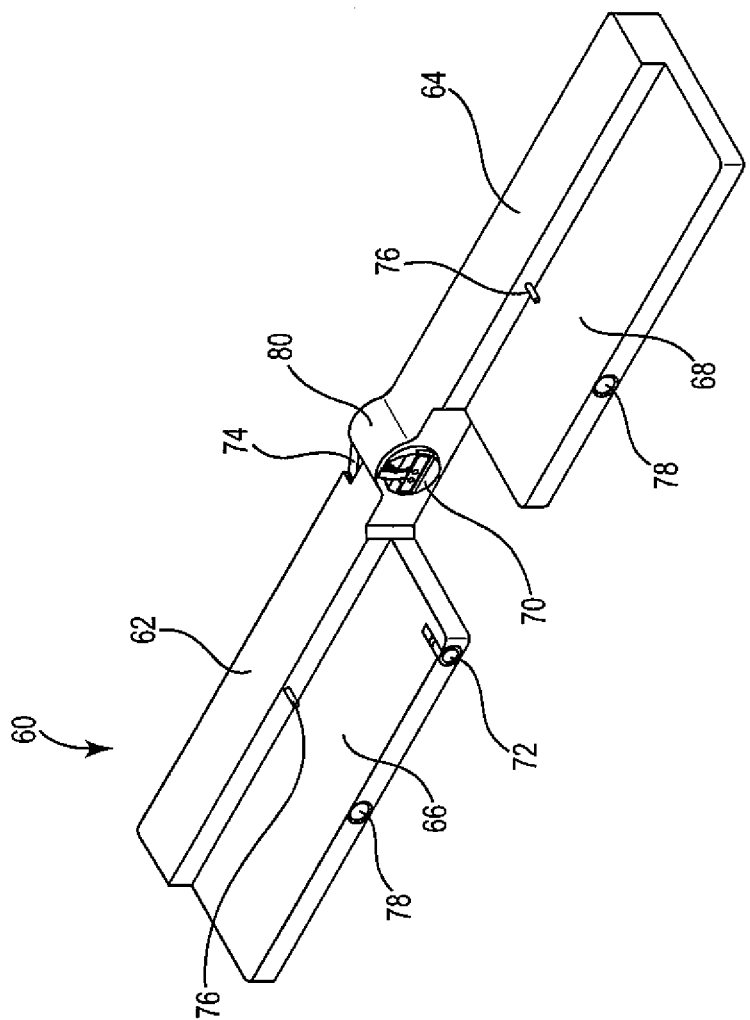
FIG. 2 illustrates a base used to adapt the platform of the coiling device of FIG. 1 to hold the battery assembly before winding.

FIG. 2 illustrates base 60 according to one embodiment of the invention. Base 60 includes a right member 62 and left member 64 joined by a central member 80 including a rotatable member 70. Also shown are a right flange 66 and a left flange 68 supporting shuttle 100 (FIG. 3) when base 60 and shuttle 100 are mated. In some embodiments, base 60 also includes a secondary drive shaft 72 operationally connected to a drive belt 74 that is in communication with rotatable portion 70. Rotatable portion 70 can be configured to mate with a drive barrel holding a electrode assembly header (not shown). In addition, base 60 can further include orientation pins 76 dimensioned and configured to mate with orientation holes on the shuttle 100 (not shown). In this embodiment, orientation holes 78 secure base 60 on the coiling device 10 by mating with locking pins 54 (not shown) on both sides of platform 30.

FIGS. 3A and 3B illustrate two different views of one embodiment of shuttle 100. Shuttle 100 includes a right portion 102 and a left portion 104 connected by a center portion 106 but discontinuous with each other so as to provide a slot 108 dimensioned to accept a mandrel 130 (shown in FIG. 3A as a coiled jelly roll assembly 180).

Also illustrated are a left main cover 114 and a left secondary cover 116 closeable over left portion 104 of shuttle 100. On the other face of shuttle 100 is a right main cover 118 and right secondary cover 120 closeable over the right portion 102 of shuttle 100. Covers 114, 116, 118 and 120 can be secured to shuttle 100 via a hinge or other suitable means for attachment.

Figure 4:
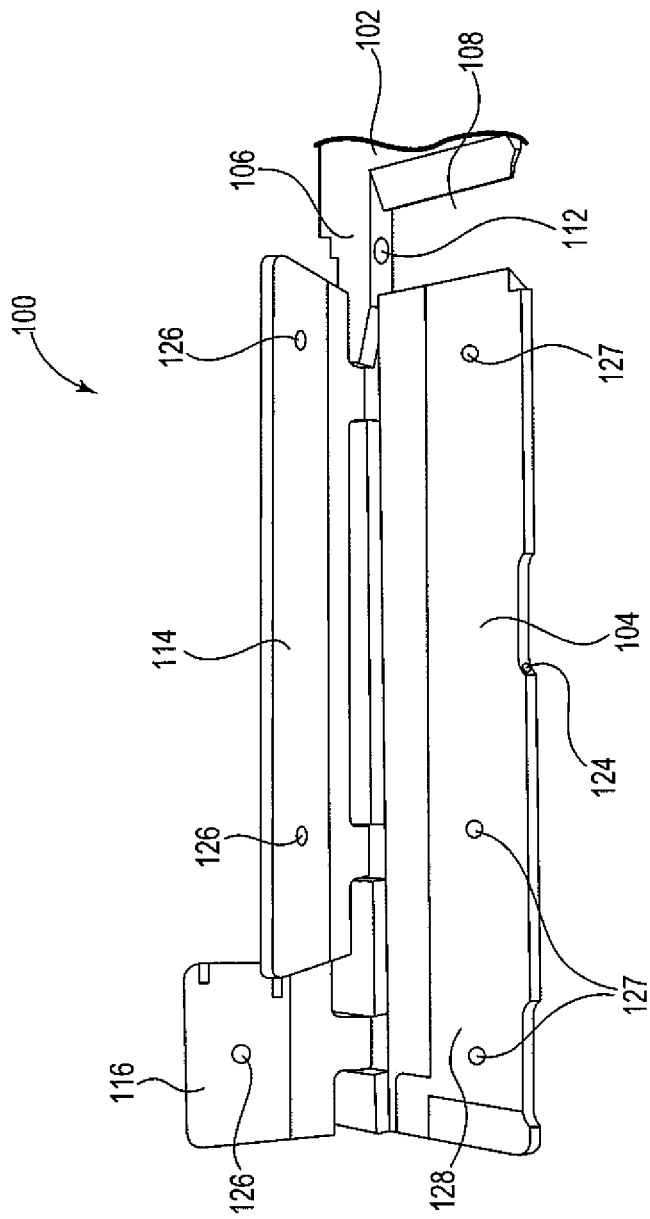
FIG. 4 is a close-up view of a portion of the shuttle illustrated in FIGS. 3A and 3B

FIG. 4 is an enlarged view of left portion 104 and center portion 106 of shuttle 100. Right portion 102 has the same configuration as the left portion 104 but the main cover 114 and secondary cover 116 are on opposite faces of shuttle 100. Because left portion 104 and right portion 102 are discontinuous with each other, a space or slot 108 for mandrel 130 is provided there between. Also shown is a passage or drive hole 112 dimensioned and configured to accept a stem 146 of ligature 140 (not shown) used to hold mandrel 130 in shuttle 100. Shuttle 100 can also include an electrode track 128 dimensioned and configured to accept an electrode (not shown). Both left main cover 114 and secondary cover 116 can also have closure magnets 126 embedded therein that are configured to mate with closure magnets 127 on shuttle 100 to allow secure positioning of electrodes when contained therein. Also shown are holes 124 present on both the right portion 102 and left portion 104 of shuttle 130 that mate with orientation pins 76 on the right member 62 and left member 64 of base 60. Those of skill in the art will also appreciate that force with which the cover is secured to the shuttle can be varied by using magnets with greater or lesser strength.

Those of skill in the art will appreciate that a unitary cover for each portion of the shuttle can be used. However, the inventors have found that providing distal secondary covers allows for adjustable placement of the electrodes 160 and 162 in tracks 128. Any releasable method of securing the cover on the shuttle is acceptable. Such other methods may include a latch and hasp, hook and loop or the like. In use, the electrodes 160 and 162 are placed in their respective tracks and main covers 114 and 118 can be closed. The distal ends of electrodes 160 and 162 remain exposed by the open secondary covers 116 and 120 and can be adjusted. After final positioning of electrodes 160 and/or 162, secondary covers 116, 120 can be closed. It should be understood that electrodes 160 and 162 are thus placed on opposite sides of shuttle 100.

Figure 5:
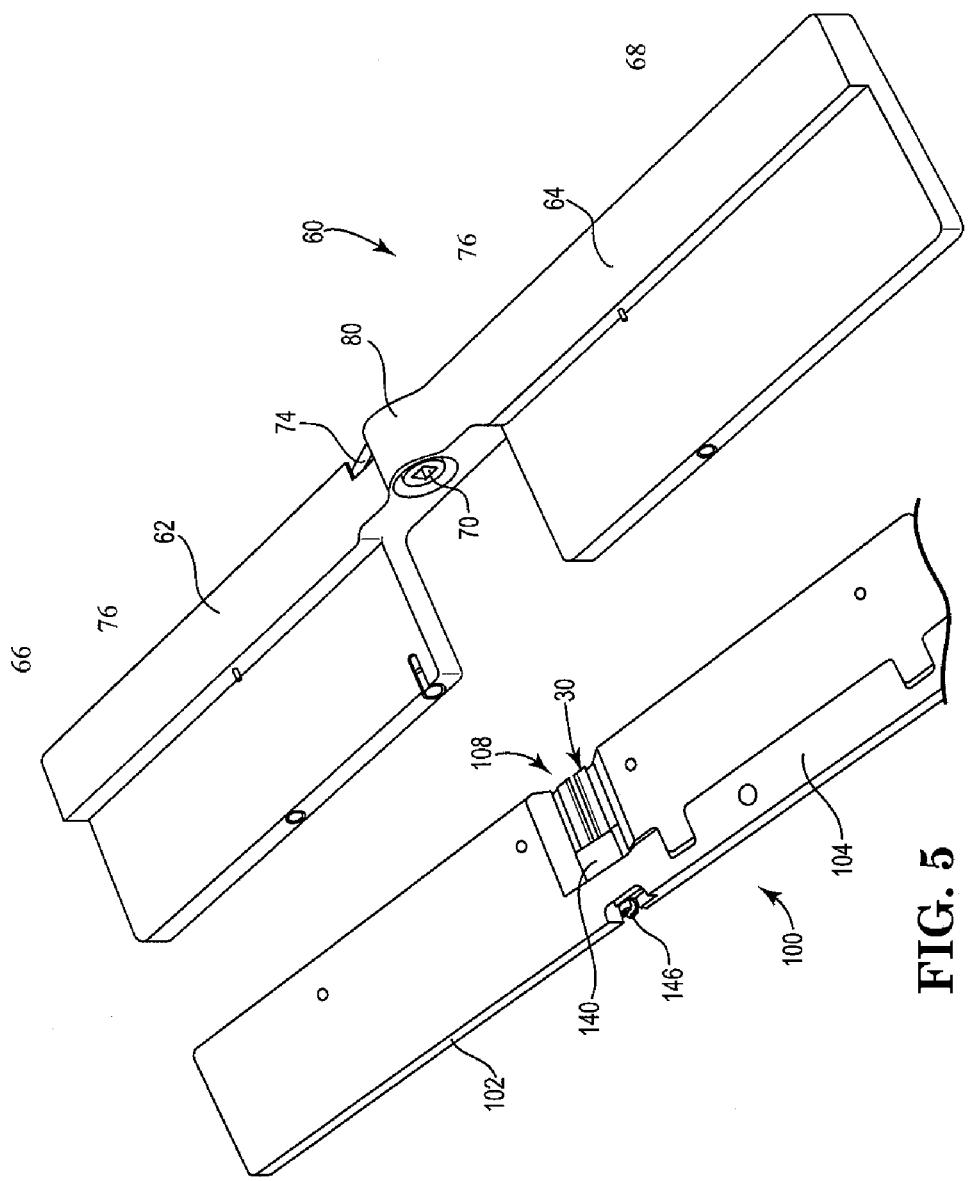
FIG. 5 illustrates how the shuttle, with electrode assembly components in place, mates with base plate prior to insertion into the coiling device.

FIG. 5 illustrates shuttle 100 being mated with base 60 with mandrel 30 secured in mandrel slot 108 by ligature 140. As discussed for FIG. 2, shuttle 100 sits on base piece flanges 66 and 68 and is secured by orientation pins 76 on the base, mating with orientation holes 124 (not shown) on the shuttle thereby providing correct orientation of shuttle 100 to base 60.

FIGS. 6A and 6B illustrate one embodiment of mandrel 130 useful with the invention. See also, U.S. provisional patent applications 61/321,677, 61/321,685, 61/321,693 and 61/321,703 incorporated herein by reference for all purposes. Mandrel 130 is planar having two faces. Mandrel 130 has a positive portion 132 and a negative portion 134 with a passage "p" separating the two portions. In addition, mandrel 130 also has removable portion 136 and perforation 138. Also shown are positive feedthrough groove 133 and negative feedthrough groove 135.

FIG. 6B is a top-plan view of mandrel 130 showing the mid-line of mandrel 130, along line 'm-m'. As illustrated in FIG. 6B, feedthrough grooves 133 and 135 are dimensioned and configured to accept feedthrough pins 164 and 166 (see, FIGS. 11A and 11B). As illustrated in FIGS. 6A and 6B, positive feedthrough groove 133 is placed closer to midline 'm-m' of mandrel 130 than negative feedthrough groove 135. This is illustrated by the distance 'd' from positive feedthrough groove 133 to the midline compared to the distance 'd1' from negative feedthrough groove 135 to midline 'm-m'. Of course, those of skill in the art will appreciate that the placement of the grooves can be equidistant from the midline. Alternatively, the negative feedthrough groove can be closer to the mid-line, if desired, or the grooves can be placed at any convenient location of the mandrel 130 as needed. However, those of skill in the art will appreciate that by having the feedthrough pins positioned at two different distances from the midline, a battery cover (not shown) can be constructed to fit over the electrodes (not shown) in only one position. This assures that the terminals can be easily identifiable as positive and negative.

Further, as shown in FIG. 6A, removable portion 136 can be separated from positive portion 132 and negative portion 134 by perforation 138. Perforation 138 can be deep enough such that mandrel 130 can be broken along perforation 138 after electrode assembly. This results in individual positive and negative portions 132 and 134 of mandrel 130. Also illustrated in FIG. 6A is an orientation notch 137 shown as a foot-type aperture on the midline of mandrel 130. In the embodiment shown, the "foot" points toward negative portion 134 of mandrel 130. Those of skill in the art will realize that such orientation guides are not necessary for mandrel 130 to function nor do they have to point towards the negative portion of the mandrel. However, such guides are helpful if consistently used.

While the mandrel 130 can be formed of any material that allows a connection between the electrodes 160, 162 and the feedthrough pins 164, 166, in some exemplary embodiments, the mandrel 130 is formed of a conductive material. In these embodiments, mandrel 130 can be formed of any conductive material. For example, the mandrel can be formed of stainless steel or aluminum. Alternatively, mandrel 130 can be made from pure titanium or titanium alloy such as grade 5 or grade 23, nickel, copper and combinations thereof.

While mandrel 130 can be made using any appropriate process, in one aspect mandrel 130 can be made using electric discharge machining (EDM). Alternatively, mandrel 130 can be made by metal extrusion or by injection molding depending on the needs of the battery and the composition of the mandrel. Grooves 133 and 135 for the feedthrough pins 164 and 166 can be made in mandrel 130 by machining, etching, or other suitable methods to provide a groove.

The width of mandrel 130 can be from about 0.2 to about 0.5 inches, more particularly from about 0.25 to about 0.4 inches and most particularly from about 0.3 to about 0.35 inches. Generally, the length of mandrel 130 ranges from about 0.5 inches to about 1 inch, more particularly from about 0.6 to about 0.8 inches and most particularly from about 0.7 to about 0.75 inches. The thickness of mandrel 130 ranges from about 0.01 to about 0.05 inches, more particularly from about 0.015 inches to about 0.03 inches and most particularly from about 0.02 to about 0.030 inches.

FIG. 7 illustrates a ligature 140 dimensioned and configured to securely hold mandrel 130 in shuttle 100. As illustrated, ligature 140 comprises two halves 142 and 144 movably connected by ligature pin 148. Each half of ligature 140 includes a body portion 154. One of the halves 142 or 144 can be configured to include an interior space dimensioned to accept mandrel 130 and include an orientation guide 150 dimensioned and configured to accept a corresponding orientation notch 137 in mandrel 130 (FIG. 6A). A stem portion 146 of ligature 140 can be dimensioned and configured to pass through drive hole 112 of shuttle 100. Ligature 140 can also include securement means 152 mateable with a ball dentent feature (not shown) in drive hole 112. In FIG. 7, the securement means is a hole 152 that accepts a corresponding pin (not shown) on the second half 142 of ligature 140 such that when ligature 140 is closed and ligature stem 146 is inserted in the drive hole 112 of shuttle 100, the mandrel 130 is secured inside the ligature 140.

FIG. 8 illustrates mandrel 130 placed into a first half 144 of ligature 140. The orientation notch 137 in the removable portion 136 of mandrel 130 mates with the orientation guide 150 in the first half 144 of the ligature 140. The second half 142 of ligature 140 is then rotated about ligature pin 148 and closed over mandrel 130 and stem 146 of ligature 140 is then placed through drive hole 112 of shuttle 100 (shown in FIG. 5). The fluted end of the stem 146 then protrudes from the drive hole 112 to engage the drive shaft 58 of coiling apparatus 10 (not shown).

Figure 9:
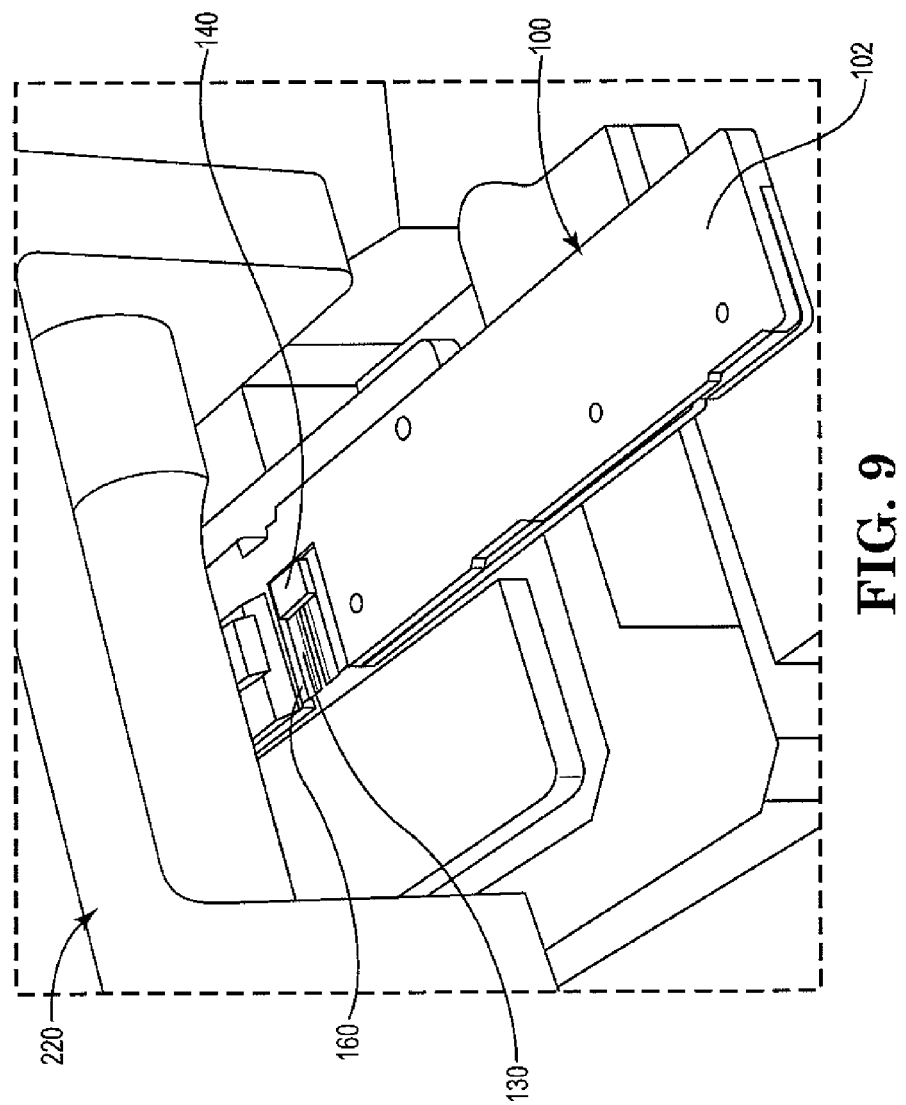
FIG. 9 illustrates the mandrel-carrying shuttle inserted into an ultrasonic welding device used to attach the positive and negative electrodes to the mandrel.

FIG. 9 illustrates positive electrode 160 being fixed to mandrel 130 using an ultrasonic welder 220. In this picture, mandrel 130 is secured by ligature 140 which in turn is secured to the shuttle 100 by placing ligature stem 146 (not shown) through the mandrel drive hole 112 (not shown) as discussed above for FIG. 8. Positive electrode 160 and negative 162 electrode (not shown) are welded to mandrel 130 using ultrasonic welding. Positive electrode 160 is welded to the positive portion of mandrel 130. Shuttle 100 is rotated, and right portion 102 is inserted into the ultrasonic welder 220 exposing the negative electrode 162 (not shown) juxtaposed to mandrel 130 and securely welded in place by the shuttle covers 118 and 120.

Figure 10:
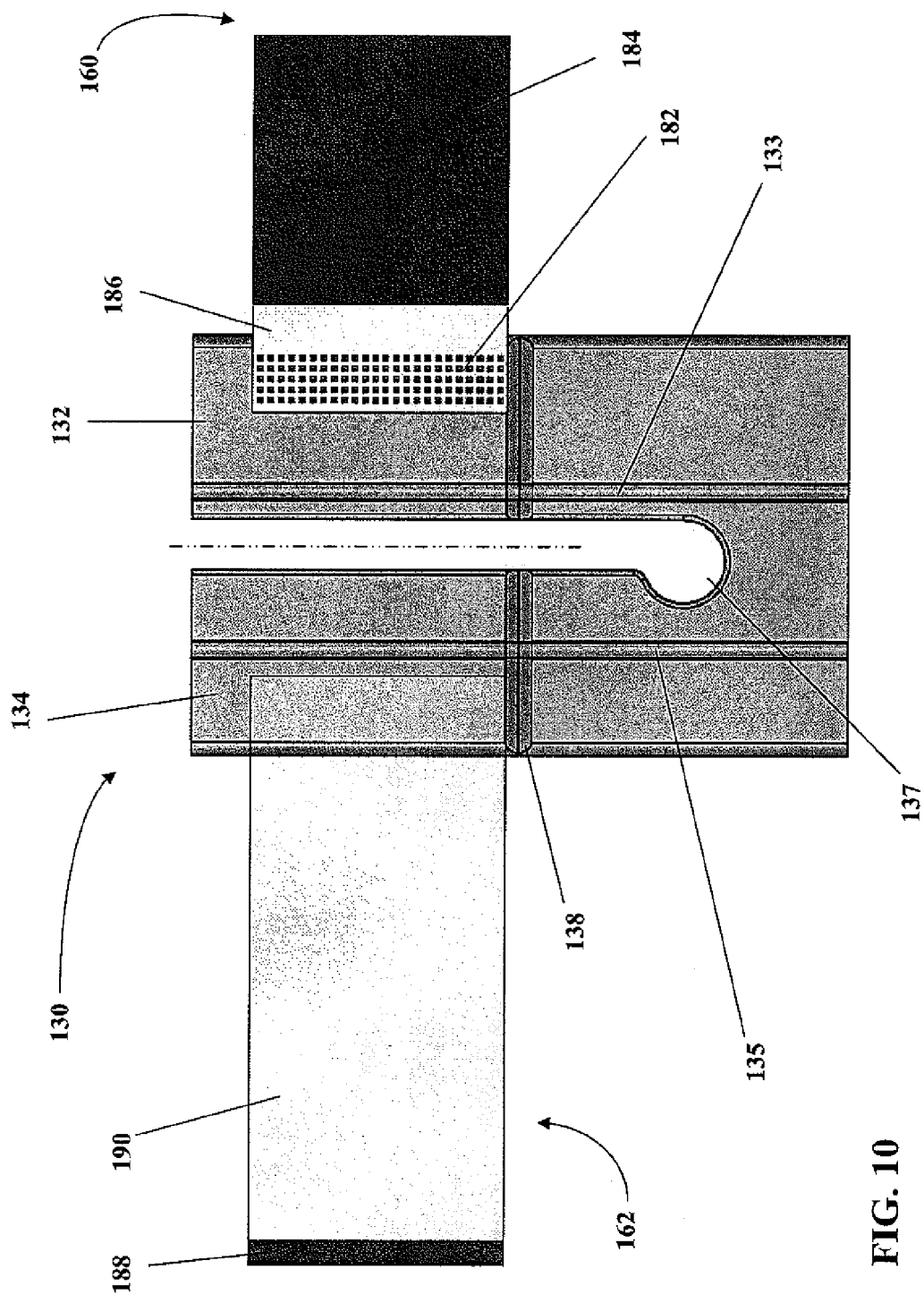
FIG. 10 is a schematic diagram of the mandrel illustrated in FIGS. 6-9 after the electrodes are attached to the positive portion and the negative portion of the mandrel.

FIG. 10 is a schematic diagram illustrating the connection of positive electrode 160 and negative electrode 162 with mandrel 130 after the process shown in FIG. 9. The ultrasonic weld of positive electrode 160 to positive portion 132 of the mandrel 130 is represented at 182. The ultrasonic weld of the negative electrode 162 with the negative portion 134 is on the opposite side of the mandrel 130.

Electrodes 160 and 162 can vary in size, shape and length. Generally the electrode can be a foil or other thin malleable conductive substrate. In various embodiments, the foil can be in the form of a metal foil such as, for example, aluminum, steel, silver, copper, nickel, titanium, etc. The length of the electrodes can range from about 2 inches to about 20 inches, particularly from about 4 inches to about 18 inches and most particularly from about 6 inches to about 16 inches. The width of the electrodes can range from about 0.1 to about 2 inches, more particularly from about 02 to about 1.75 inches and most particularly from about 0.3 to about 1.5 inches. The thickness of the electrodes can vary from about 0.003 inches to about 0.04 inches, in particular from about 0.004 to about 0.03 inches and most particularly from about 0.005 to about 0.025 inches. The electrodes can vary in composition depending on the battery chemistry being used and the mandrel can be optimized for such.

Positive electrode 160 can be coated with a positive active material 184. As illustrated, positive electrode 160 has a proximal end 186 that is not coated with active material. Proximal end 186 is attached at 182 to positive portion 132 of mandrel 130. Similarly, negative electrode 162 can be coated with a negative active material 188. Proximal end 190 of negative electrode 162 is not coated with active material and facilitates attachment (not shown) to the negative portion 134 of mandrel 130. In this embodiment, positive electrode 160 and negative electrode 162 are attached to mandrel 130 by ultrasonic welding as shown in FIG. 9. However, those of skill in the art will appreciate that electrodes 160 and 162 can be attached by any appropriate means such as, for example, laser welding, ultrasonic welding, resistance welding or an interference fit or the like.

Those of skill in the art will appreciate that positive active material 184 can be any of those materials used as such in electrode technology. For example, positive active material 184 can be lithium cobalt oxide (rechargeable), carbon monofluoride ($CF_x$), silver vanadium oxide (primary), or combinations thereof. Similarly, negative active material 190 can be any appropriate negative active material used in electrode technology. Exemplary materials include lithium titanate, artificial graphite powder (MCMB), lithium, or combinations thereof.

Both positive 160 and negative electrodes 162 can be coated on one side or both sides of the electrode to provide an electron flow suitable to generate a current. However, those of skill in the art will appreciate that coating of the electrodes on both sides with active material allows for more efficient use of the two sides of the electrodes, resulting in increased energy and power in contrast to a single side coated electrode. It should be understood that the proximal and/or distal ends of the electrodes do not need to be coated on one or both sides. It should be appreciated that any suitable combination of coatings and coated portions of the electrode(s) is within the scope of the invention and is not limiting.

Figure 11B:
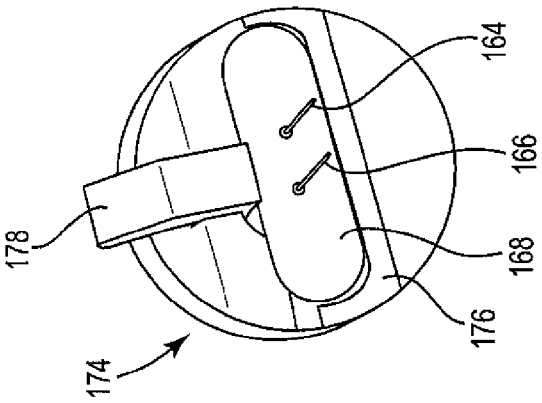
FIGS. 11A and 11B illustrate the use of a header drive barrel used to carry the electrode assembly header comprising a battery cover and positive and negative feedthrough pins for attachment to the mandrel.
Figure 11A:
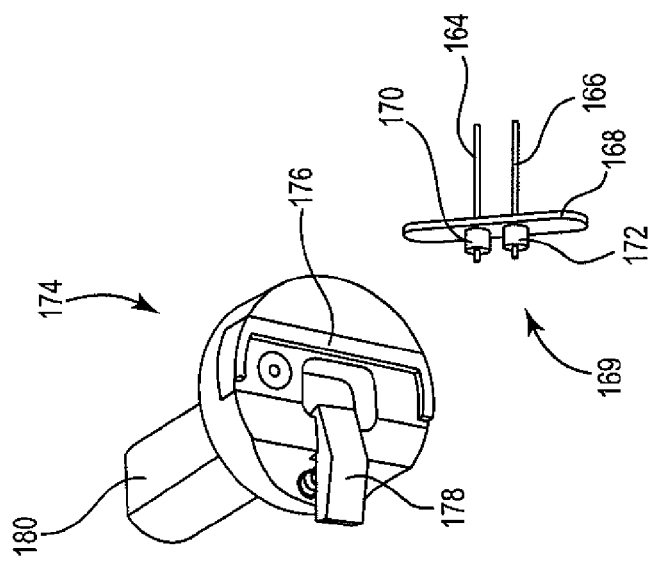

FIGS. 11A and 11B illustrate electrode assembly header 169 including a battery cover 168, positive feedthrough pin 164 and negative feedthrough pin 166. See for example, U.S. provisional patent application 61/321,693 incorporated herein by reference for all purposes. As illustrated in FIG. 11A, positive and negative feedthrough pins 164 and 166 are placed in sleeves 170 and 172 in battery cover 168. In the embodiment shown, sleeves 170 and 172 are made of an electrically conductive material such as those usable for the feedthrough pins 164 and 166. Sleeves 170 and 172 project above the top surface of the battery cover 168, therefore allowing sleeves 170 and 172 to be used as the positive and negative terminals of the battery when assembly is completed.

FIG. 11A also shows a header drive barrel 174 having a drive plate 176, a drive barrel clamp 178 and a drive barrel shaft 180. The header drive barrel 174 is configured to accept electrode assembly header 169. The mating of battery cover 168 and positioning of positive and negative feedthrough pins 164 and 166 can be asymmetric to allow for only one orientation of battery cover 168 and feedthrough pins 164 and 166 in drive barrel 174. FIG. 11B shows the underside of battery cover 168 and the positive feedthrough pin 164 and negative feedthrough pin 166 placed in drive barrel 174 and secured in place with barrel clamp 178.

Feedthrough pins 164 and 166 can be sized to fit within grooves 133 and 135 in mandrel 130 and can be made of any electrically conductive material. For example, feedthrough pins 164 and 166 can be made of steel, platinum, aluminum and titanium, etc. In some embodiments, the feedthrough pins can be made of an alloy such as, for example, platinum-iridium such as 90 Pt/10 Ir. The length of the positive and negative feedthrough pins can range from about 0.4 to about 1 inches in length, more particularly from about 0.5 to about 0.75 inches and most particularly from about 0.5 to about 0.7 inches. The diameter of the feedthrough pins can vary and can be from about 0.050 to about 0.3 inches, in particular from about 0.01 to about 0.025 inches and most particularly from about 0.01 to about 0.015 inches. The feedthrough pins extend outside of the battery case and can be cut to length as required.

Once the header assembly 169 has been assembled and fixed to drive barrel 174 the drive barrel shaft 180 is inserted through the rotatable portion 70 of base 60. The shuttle 100 carrying the mandrel 30 held by ligature 140 is then mated with base 60 such that the header assembly 169 is juxtaposed to the mandrel 130 with the positive feedthrough pin 164 juxtaposed to positive feedthrough groove 133 and the negative feedthrough pin 166 juxtaposed to the negative feedthrough groove 135 at the top of the positive portion 132 and the negative portion 134 of mandrel 130.

Figure 12:
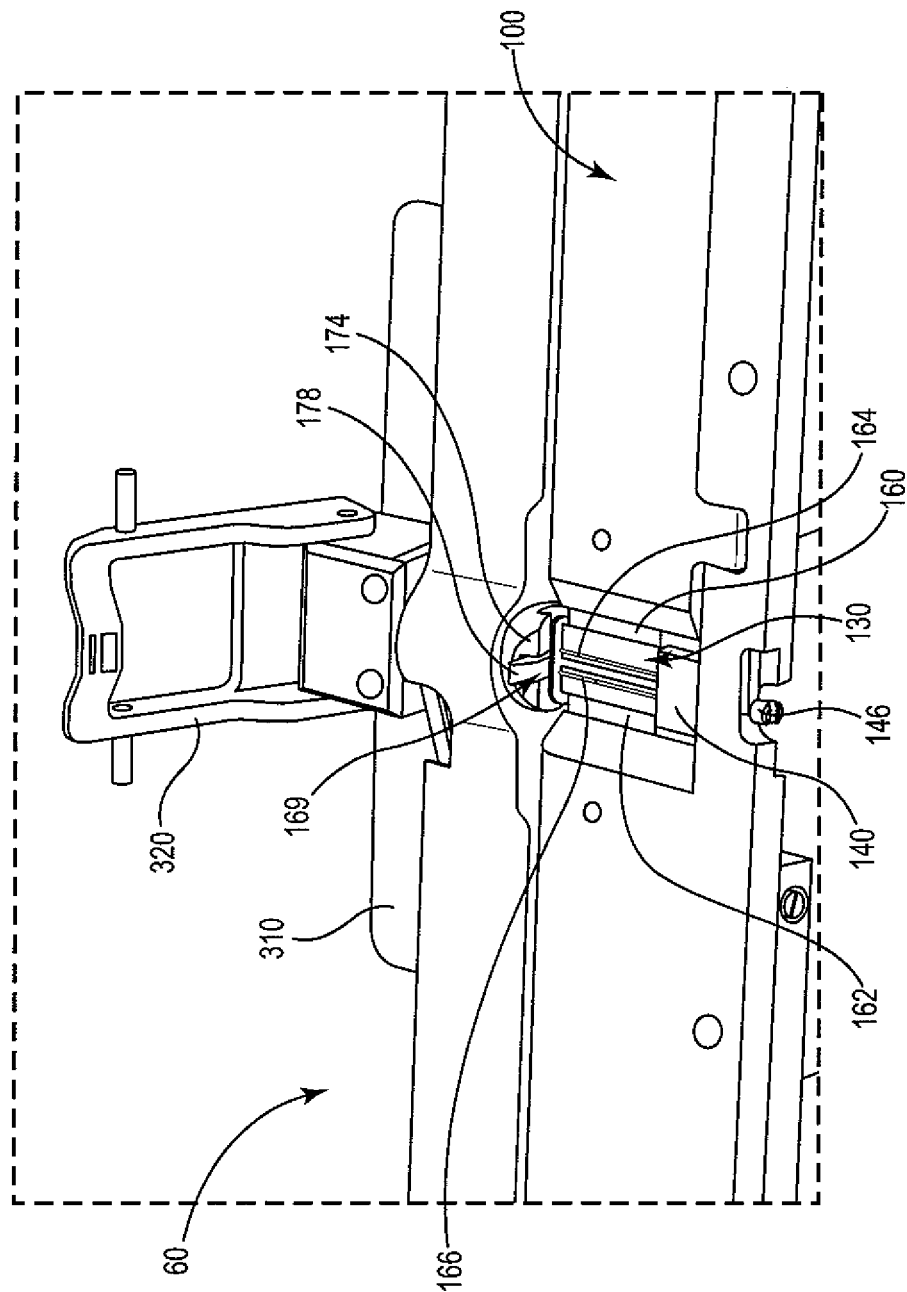
FIG. 12 illustrates the mandrel being prepared for the attachment of feedthrough pins. In this view, the shuttle, with a mandrel having electrodes attached, is mated to the base and loaded in a hold-down tool for insertion into a laser welder to attach the feedthrough pins to the mandrel.

FIG. 12 shows base 60 mated with shuttle 100 and prepared for the welding of the feedthrough pins 164 and 166 to mandrel 130. In FIG. 12, the base plate/shuttle pair 60/100 assembly with header drive barrel 174 holding the electrode assembly header 169, has been inserted into a hold down tool 310. Hold down tool 310 includes a closeable clamp 320. Mandrel 130 is held by ligature 140 and ligature stem 148 is inserted through the drive hole 112 of shuttle 100. Battery cover 168 (not visible) is held securely by the barrel clamp 178 and barrel shaft 180 has been inserted into the rotatable member 70 of base 60.

Figure 13:
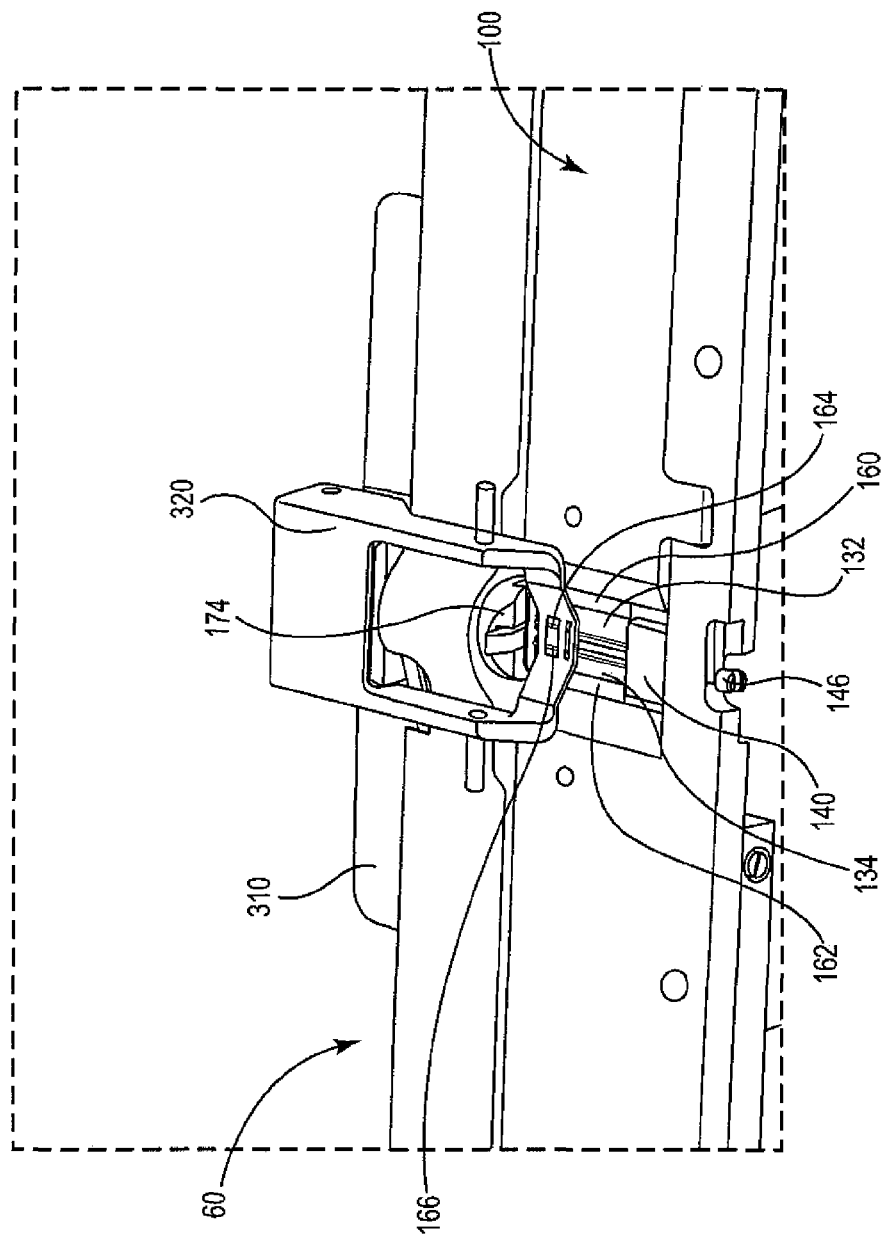
FIG. 13 provides an aspect shown in FIG. 10 but with a clamp on the hold-down tool closed over the feedthrough pins in readiness for welding the pins to the mandrel.

FIG. 13 illustrates the same configuration as FIG. 12 except hold down tool clamp 320 has been closed to securely juxtapose positive feedthrough pin 164 to positive portion 132 of mandrel 130 and negative feedthrough pin 166 to negative portion 134 of mandrel 130. Also shown is positive electrode 160 which is welded to positive portion of mandrel 132 and negative electrode 162 which is welded to negative portion of mandrel 134 on the opposite side.

Figure 14:
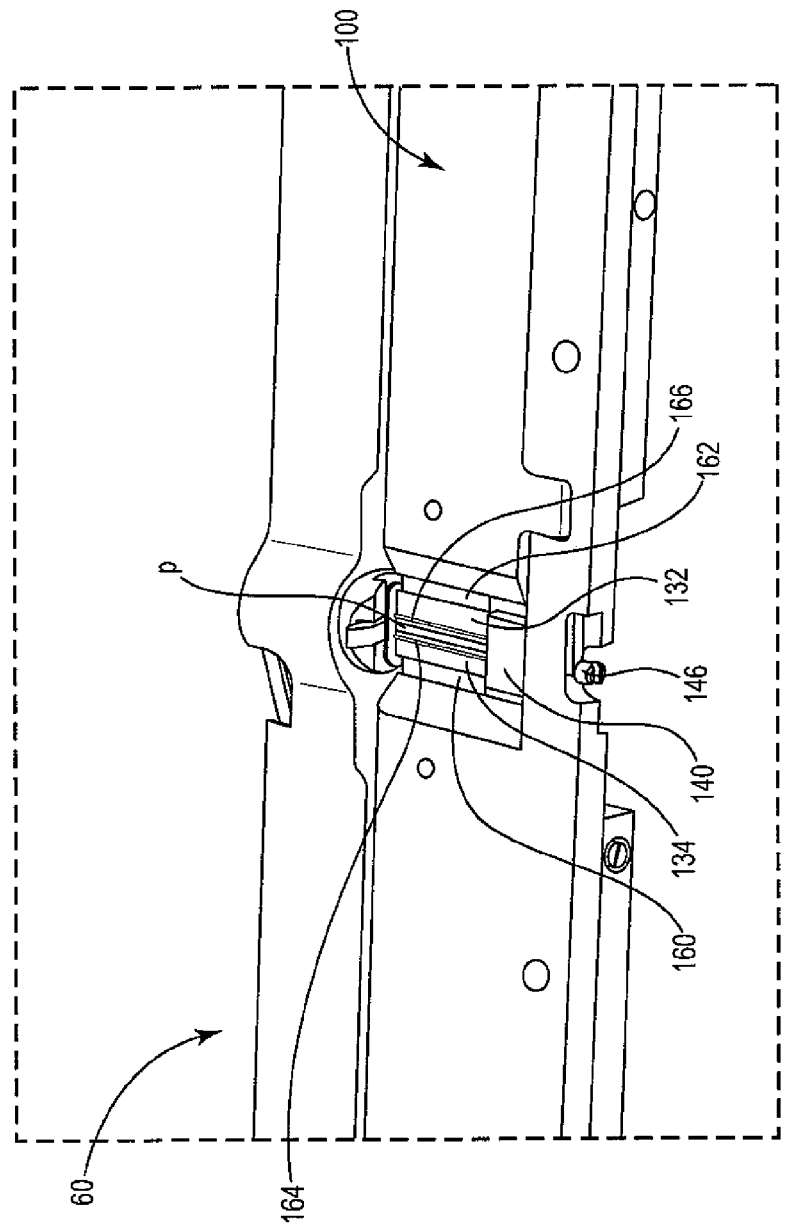
FIG. 14 illustrates the mandrel secured in the shuttle/base carrier with electrodes and feedthrough pins attached and ready for insertion in the coiling device.

FIG. 14 shows the electrode assembly secured in base/shuttle assembly 60/100 after welding of electrodes 162/164 to mandrel 130 prior to coiling. Also shown in this view is passage 'p' between the positive 132 and negative 134 portions of mandrel 130.

Figure 15:
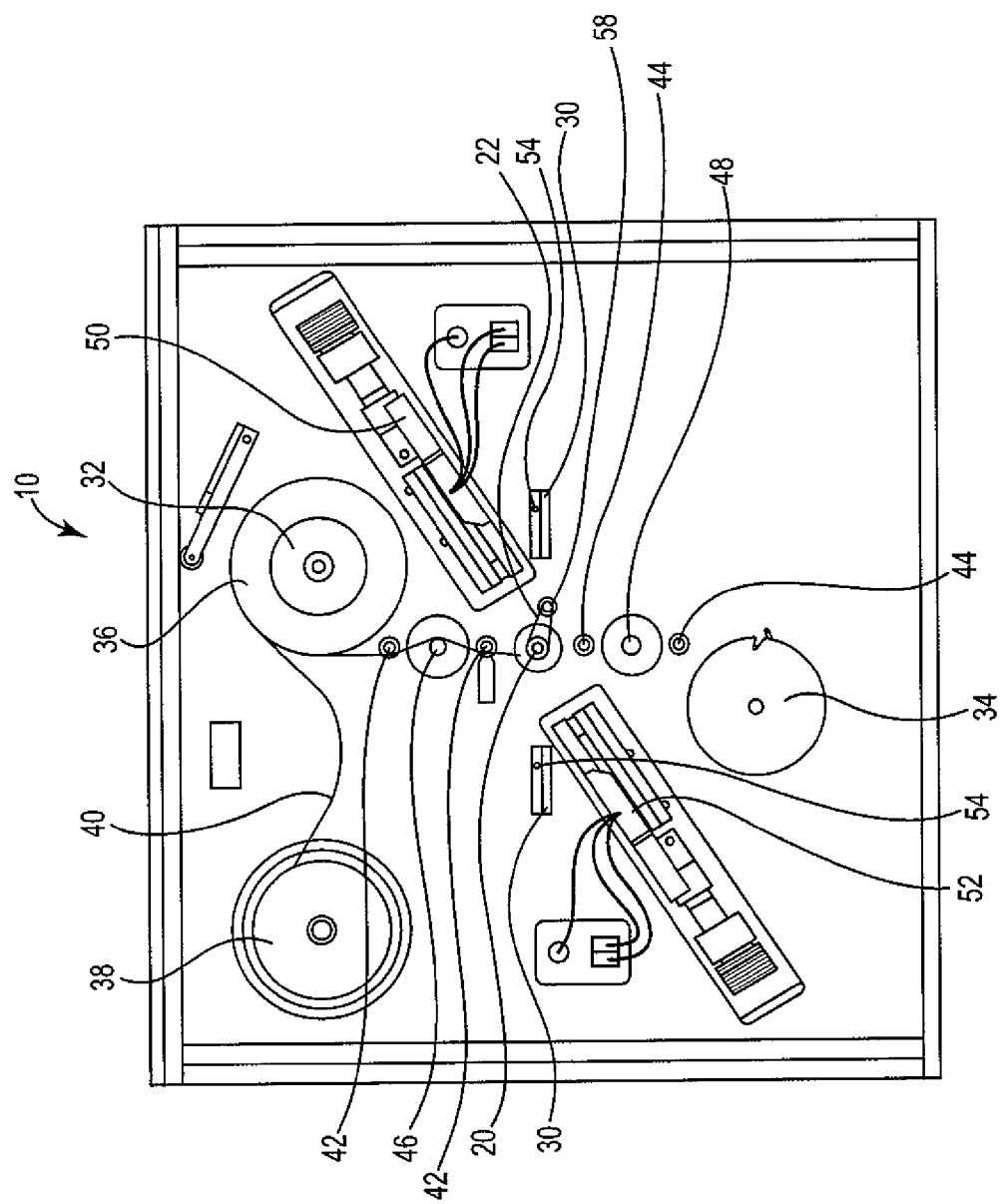
FIG. 15 illustrates the coiling device prior to insertion of the shuttle/base carrier.

FIG. 15 illustrates coiling device 10 shown in FIG. 1, prior to insertion of base/shuttle/mandrel 60/100/130 assembly. Also shown in this view are orientation/locking pins 54 that mate with orientation holes 78 in base 60 securing base 60 to platform pieces 30. Separator strip 36 is threaded through upper guide rollers 42 and around the upper tension roller 46. Winding apparatus 20 is configured to mate with ligature stem 146. In some embodiments, a winding belt 22 operationally connects winding apparatus 20 with a drive shaft 58 which mates with secondary drive shaft 72 on base 60.

Figure 16:
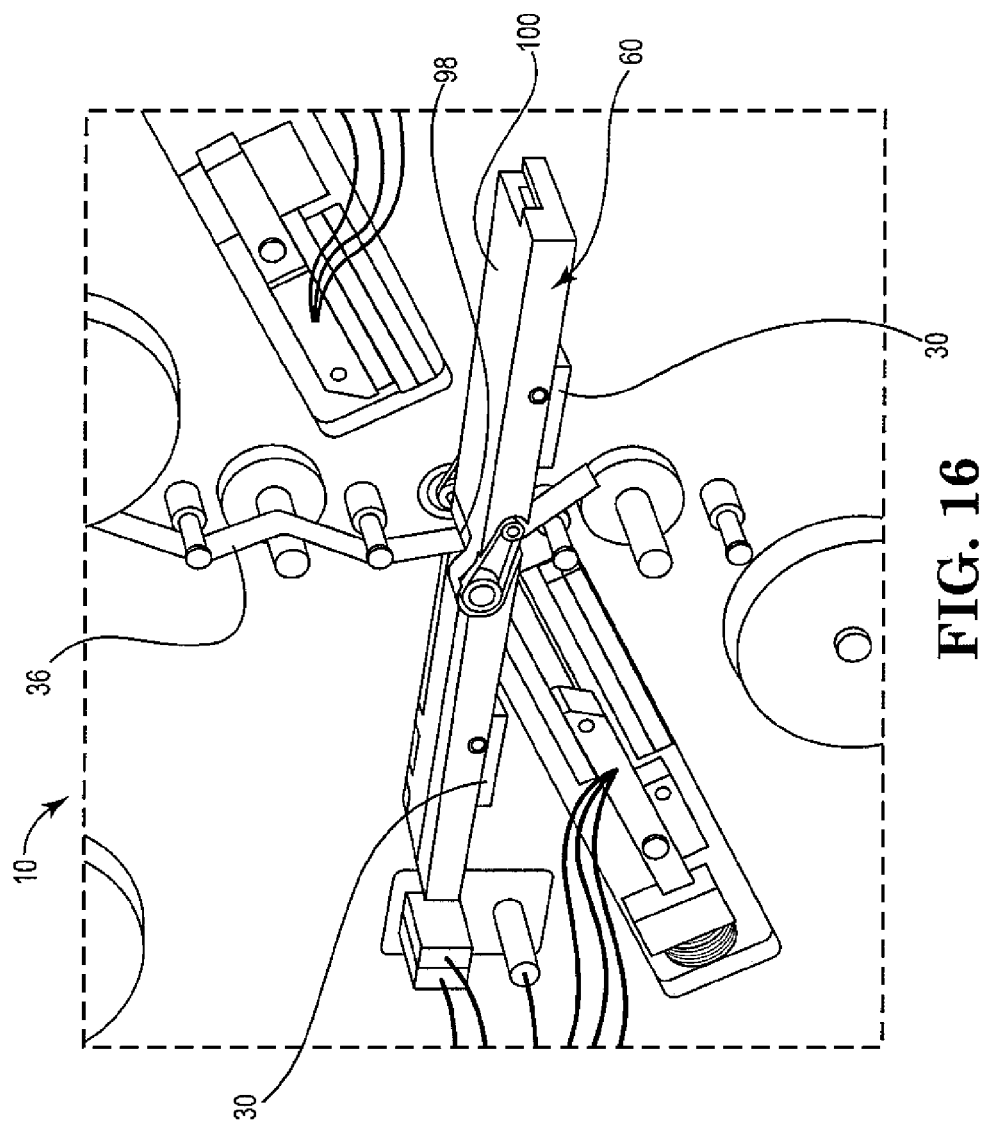
FIG. 16 illustrates the shuttle/base carrier having been inserted into the coiling device and a separator strip being threaded through a passage formed in the mandrel between the positive portion and the negative portion.

FIG. 16 shows base/shuttle 60/100 assembly, with mandrel 130 placed in coiling device 10 and secured to platform 30. Separator strip 36 is being threaded through the mandrel passage 'p' (not visible).

Figure 17:
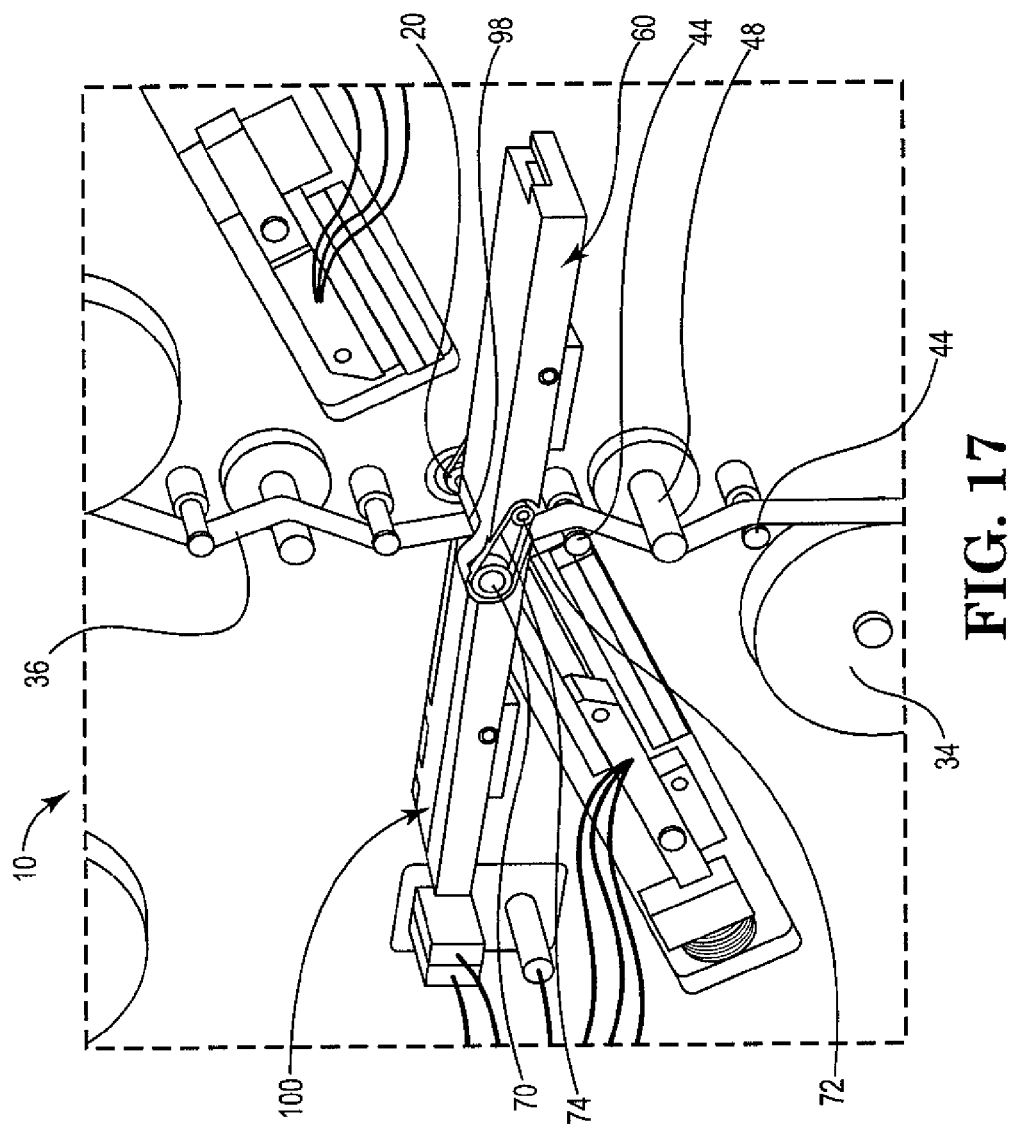
FIG. 17 illustrates the electrode assembly prepared for winding in the coiler.

FIG. 17 is the same view as FIG. 16 except that separator strip 36 has been passed through mandrel passage 'p' and threaded through lower guide rollers 44, lower tension roller 48 and around second spool 34.

Figure 18:
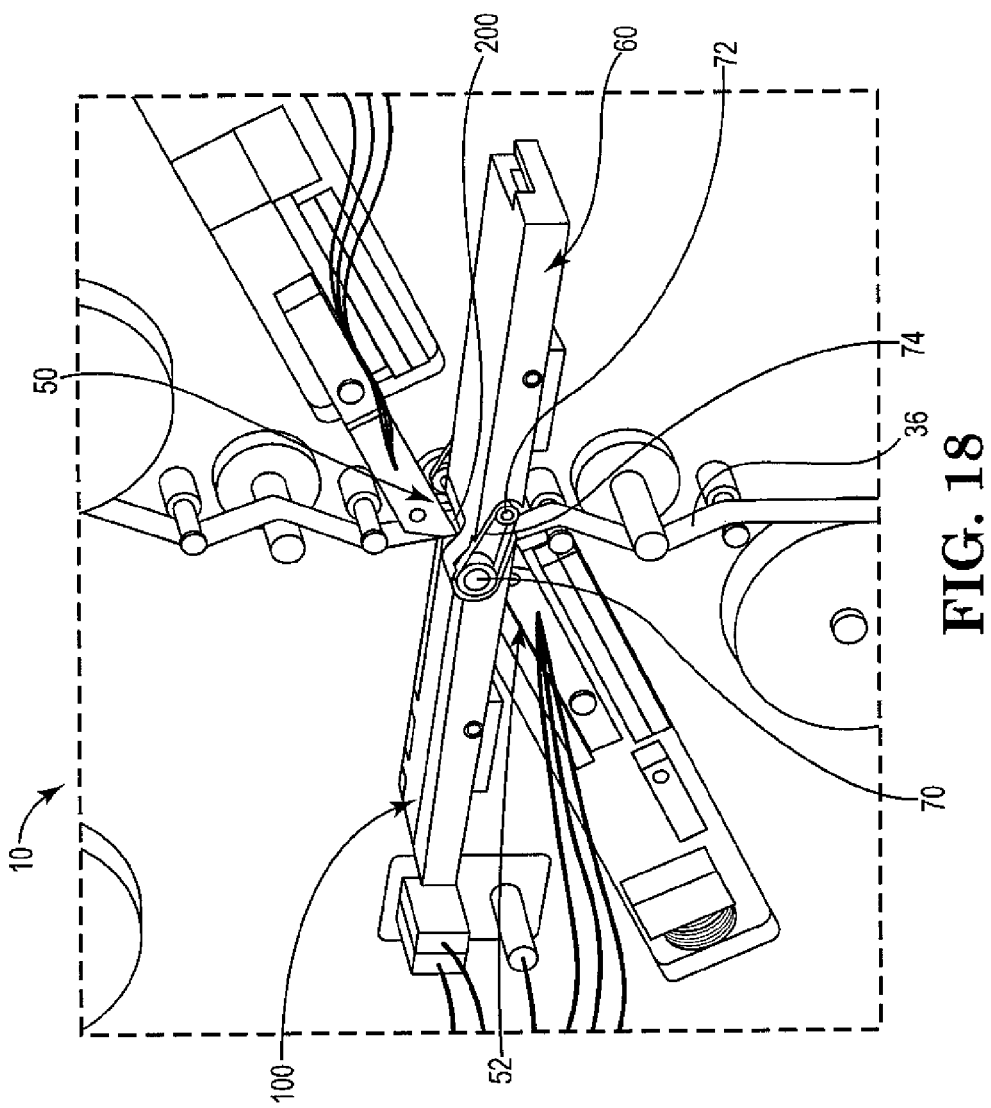
FIG. 18 illustrates the coiled electrode assembly with the remainder of the separator strip being sealed to the jelly roll by heating elements.

FIG. 18 is a close-up view of coiling device 10 at the end of the coiling process. In FIG. 18, the winding apparatus has turned the mandrel approximately 5.5 rotations to coil electrodes 160 and 162 and separator strip 36 around mandrel 130. A further single rotation of mandrel 130 provides an outer layer of separator strip 36 that is cut and sealed to itself using heat sealers 50 and 52 to seal the jelly roll assembly. Due to coupling of winding apparatus 20 to winding belt 22, drive shaft 58 (FIG. 15) is also rotated in unison with the winding apparatus 20. The primary drive shaft 58 couples to the secondary drive shaft 72 of the base 60 which turns drive belt 74 to rotating rotatable member 70 which holds barrel shaft 180. The arrangement illustrated in FIG. 18 rotates mandrel 130 at both removable portion 136, held by ligature 140, and at header 169 held by header drive barrel 174. While those of skill in the art will appreciate that the coiling of the jelly roll assembly could be accomplished only by rotation of the mandrel held by the ligature 130, use of the secondary drive shaft/winding belt 72/74 allows for more uniform rotation of mandrel 130. This helps to alleviate torquing or deformation to provide more reproducible and consistent coiling of the electrode assembly 200.

In some embodiments, brakes (not shown) on the upper and lower spools 32 and 34 apply tension to the separator strip 36. Tension sensors (not shown) in tension rollers 46 and 48 sense tension and provide feedback to brakes to ensure applied tension matches a desired tension. Separator tension and coiling speed (RPM) are programmed by operating software including one or more computer chips and electronics in communication with the software and chip(s) and can be adjusted for increased compactness (greater tension) or less compactness (less tension) as desired.

Also shown in FIG. 18 are upper and lower heating elements 50 and 52 which movably contact the coiled jelly roll assembly. A suitable software program can control cutting separator strip 36 and sealing the strip to itself along the outer layer of wrap of the jelly roll.

Suitable separator material can be any non-conductive material such as polyethylene, polypropylene and layered combinations thereof. The separator generally has a larger width and length than the electrode(s) it covers so as to fully encase the electrode(s). Suitable separators have a length of from about 4 inches to about 36 inches, in particular from about 8 inches to about 34 inches and most particularly from about 12 inches to about 30 inches and widths of from about 0.2 inches to about 2 inches, in particular from about 0.3 inches to about 1.75 inches and most particularly from about 0.4 inches to about 1.5 inches. Suitable thicknesses for separators range from about 0.0008 inches to about 0.004 inches. Generally, separator 36 can be sized appropriately to extend beyond the bottom portion of positive and negative portions 132 and 134 after removal of removable portion 136.

Figure 19:
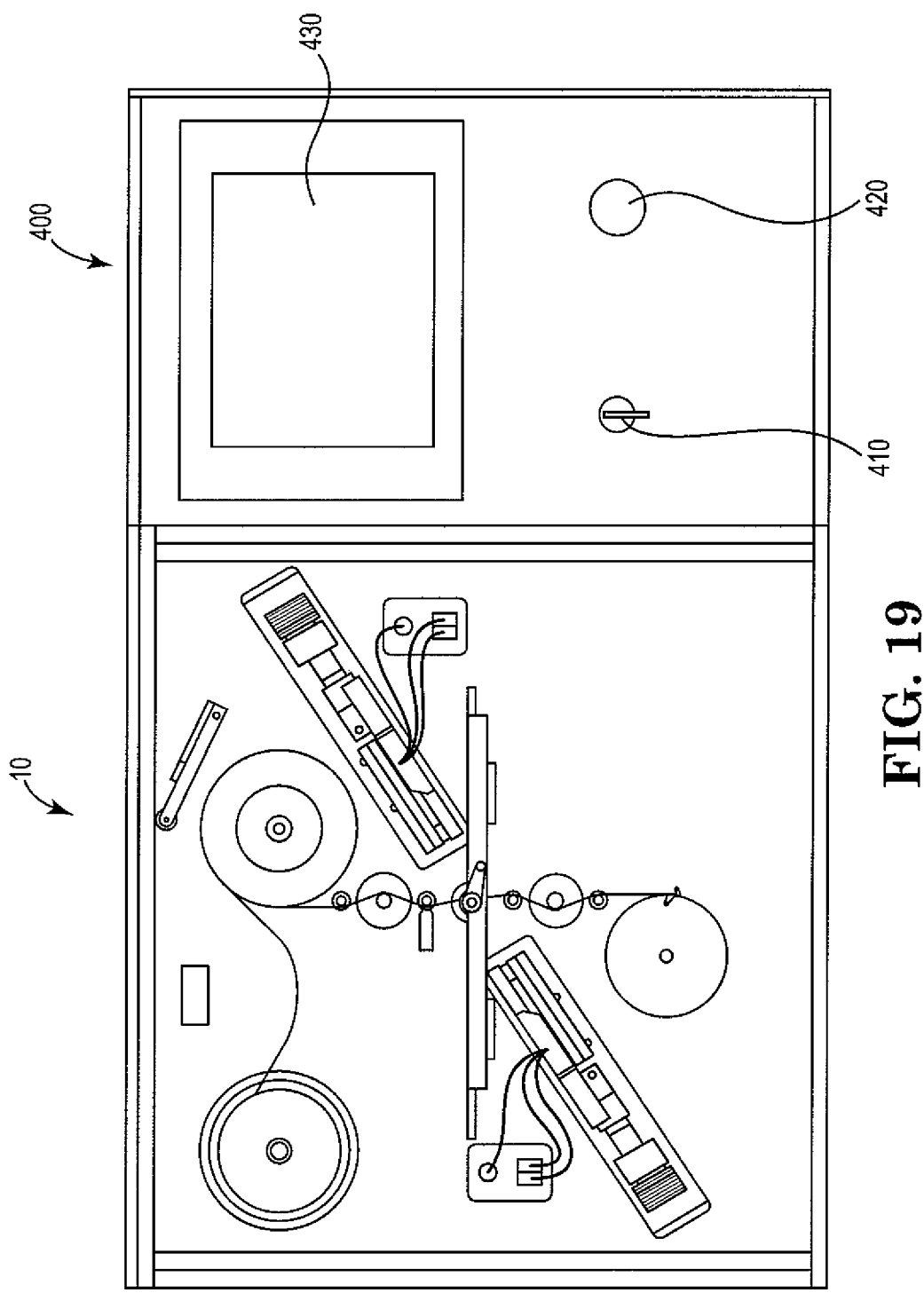
FIG. 19 is a front-plan view of one embodiment of a coiling device according to the invention. The figure illustrates the coiling device configured for automation with a human machine interface for the programmed coiling of a jelly roll electrode assembly.

FIG. 19 shows coiler 10 configured to run under programmed conditions when operatively linked to a computerized human machine interface (HMI). The HMI operates using specialized software such as a Programmable Logic Controller (PLC) program. Knob 410 is the on/off switch. Knob 420 is an emergency stop (e-stop) to disconnect power to coiling device 10. Display 430 provides a visual output of the program parameters and information status including the tension of coiling and the temperature of the heat stakes. In the embodiment shown, the display is a touch-screen display allowing for use without a keyboard.

Figure 20:
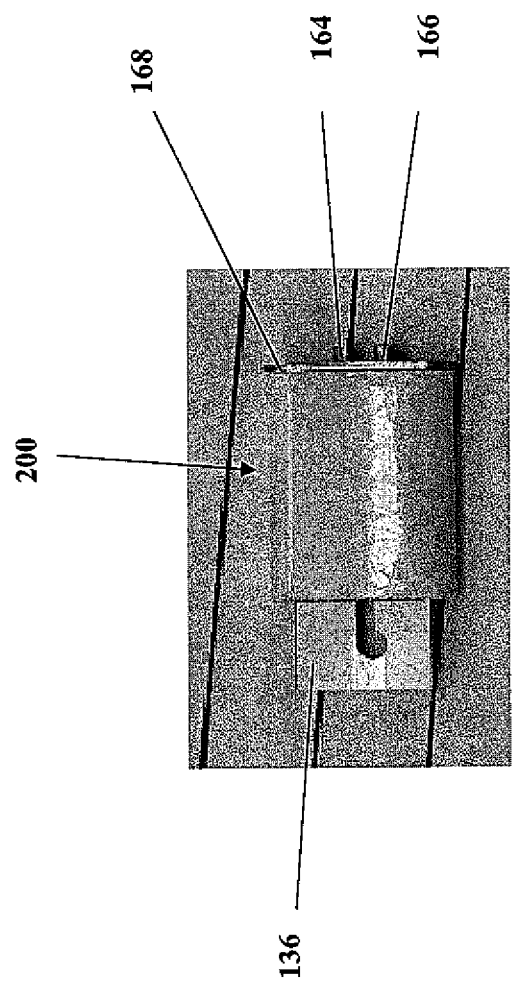
FIG. 20 illustrates the completed jelly roll assembly before removal of the removable portion of the mandrel.

FIG. 20 shows the completed jelly roll assembly 200 removed from ligature 130 and prior to removal of removable portion 136. The phrase "removable portion" refers to a portion of mandrel 136 that can be detached from the remainder of the mandrel 130. This can be accomplished by scoring a groove deep enough to allow the removable portion 136 to be "snapped off" from the remainder of mandrel 130. Alternatively, the removal portion 136 can be detached by cutting, breaking, tearing or clipping the portion from the remainder of the mandrel 130.

After jelly roll assembly 200 has been removed from coiler device 10 and removable portion 136 has been removed, the jelly roll assembly 200 can be placed in a battery case (not shown). An appropriate electrolyte can be added to the assembly and the battery cover sealed to the case to provide a completed battery. It will be appreciated by those of skill in the art that, because electrodes 160 and 162 and feedthrough pins 164 and 166 are in electrical connection with each other, upon completion of the battery, the portion of the feedthrough pins 164 and 166 extending above the battery cover 168, then become positive and negative terminals for the battery.

Various exemplary embodiments of devices and compounds as generally described above and methods according to this invention, will be understood more readily by reference to the following example, which is provided by way of illustration and is not intended to be limiting of the invention in any fashion.

Example 1

In operation, the coiler apparatus is used to make an electrode battery assembly by following these steps.

Ultra-Sonic Weld (USW) Electrodes to Mandrel

1. Place mandrel in shuttle ligature. Locating ("P") feature on mandrel, mate with reverse feature on clamp to ensure proper orientation.
2. Insert ligature into shuttle.
3. Orient shuttle on work table facing up.
4. On positive side, open both large and small covers.
5. Place positive electrode in channel and close large cover.
6. With small cover open, adjust the "x" position (along the path of the track) of the electrode on the mandrel. Once placed properly, close small cover.
7. Flip shuttle assembly over.
8. Repeat steps 4-6 with negative electrode.
9. Insert shuttle assembly into fixture at an ultra-sonic weld (USW) station. Locating pins on fixture line up with holes on shuttle for proper alignment.
10. Perform weld of electrode to mandrel.
11. Remove shuttle from fixture, flip over, and repeat on opposite side to weld the other electrode.
12. Proceed to laser weld (subassembly remains in Shuttle).

Laser Weld Header Assembly to Mandrel

13. Place header assembly into barrel for base. Locating features on barrel ensure proper orientation of header assembly.
14. Insert barrel into base.
15. Align shuttle with base and mate together. Orientation pins on base mate with holes on shuttle for proper orientation.
16. When mating shuttle and base together, ensure feedthrough pins from header assembly (base) slide into pin channels in mandrel (shuttle). Alignment and orientation are controlled by shuttle/base assembly.
17. Insert mated shuttle/base into laser weld fixture. Locating pins on fixture align with holes on shuttle/bases to ensure proper alignment and orientation.
18. Close clamp on fixture to hold pins from header assembly in channels on mandrel during laser weld.
19. Perform laser weld on each pin.
20. Remove shuttle/base combo from laser weld fixture.
21. Proceed to coiling station (assembly remains in shuttle/base combo).

Coiling

22. Insert Shuttle/Base combo into coiler. Locking pins on coiler align with holes on shuttle/base combo for proper orientation and alignment.
23. Thread separator over upper spools on coiler, between legs of mandrel, and over bottom spools on coiler. Secure end of separator.
24. Begin coiling. Brakes on coiler apply tension to separator. Tension sensors on coiler sense tension and feedback to brakes to ensure applied tension matches desired tension. Separator tension and coiling speed (RPM) are programmed and can be varied throughout the cycle.
25. Separator trim/heat seal happens as part of the coiling program. Heat stake temperature, distance, and speed can be varied by program to control seal.
26. Once cycle is complete, remove Shuttle/Base combo from coiler.
27. Remove coiled battery assembly from Shuttle/Base combo.
28. Break off removable portion from mandrel.
29. Insert coil into battery case liner and case.

The following paragraphs enumerated consecutively from 1 through 48 provide for various aspects of the present invention. In one embodiment, in a first paragraph (1), the present invention provides:

1. A system for preparing an electrode assembly comprising:
a base comprising a right member and a left member connected by a central member wherein the central member is configured to accept an electrode assembly header; and
a shuttle, comprising a right portion and a left portion connected by a center portion, wherein the left portion comprises a cover, the right portion comprises a cover, and the center portion is configured to accept a mandrel, wherein the left and right covers are positioned on opposite sides of the shuttle,
wherein the base is configured to mate with the shuttle, such that the mandrel mates with the electrode assembly header between the center portion of the shuttle and central member of the base.

2. The system of paragraph 1, wherein the center portion of the shuttle further comprises a ligature to support the mandrel.

3. The system of paragraph 1, wherein the central member further includes a rotatable portion, wherein the rotatable portion is configured to accept a portion of the electrode assembly header.

4. The system of paragraph 3, wherein the central member is configured to accept a drive barrel, wherein the drive barrel includes the electrode assembly header.

5. The system of paragraph 4, wherein the drive barrel further includes a barrel shaft that rotatably engages with the central member.

6. The system of paragraph 1, wherein one of the left member or right member includes a drive shaft, the drive shaft having a first end and a second end, the second end including a drive belt wherein the drive belt engages the barrel shaft, and the first end is configured to engage with a second drive shaft.

7. The system of paragraph 1, wherein the mandrel comprises a positive portion, a negative portion, a removable portion connecting the positive portion and the negative portion and a passage between the positive portion and the negative portion.

8. The system of paragraph 7, wherein the ligature engages the removable portion.

9. The system of paragraph 8, wherein a body portion of the ligature is configured to hold the removable portion of the mandrel.

10. The system of paragraph 9, wherein a stem of the ligature is configured to pass through a drive hole in the center portion of the shuttle.

11. The system of paragraph 9, wherein the stem of the ligature is configured to engage a winding apparatus.

12. The system of any of paragraphs 1, 2 and 6-11 wherein either the left portion, right portion or both of the shuttle are configured to accommodate an electrode strip.

13. The system of any of paragraphs 1-2 and 6-12, wherein the left cover, right cover, or both are hinged to the shuttle.

14. The system of any of paragraphs 1-2 and 6-13, wherein the left cover, right cover, or both comprise two or more pieces.

15. The system of any of paragraphs 1-2 and 6-14, wherein the left cover, right cover, or both and the left portion or right portion or both of the shuttle are magnetic.

16. A method to secure an electrode assembly header comprising the steps:
   placing a mandrel into a central portion of a shuttle; and
   mating the shuttle with a base, wherein
   the base comprises a right member and a left member connected by a central member wherein the central member is configured to accept an electrode assembly header,
   the shuttle comprises a right portion and a left portion connected by a center portion, wherein the left portion comprises a cover, the right portion comprises a cover, and the center portion is configured to accept a mandrel, wherein the left and right covers are positioned on opposite sides of the shuttle, and
   wherein the base is configured to mate with the shuttle, such that the mandrel mates with the electrode assembly header with the center portion of the shuttle and central member of the base.

17. The method of paragraph 16, wherein the center portion of the shuttle further comprises a ligature to support the mandrel.

18. The method of paragraph 16, wherein the central member further includes a rotatable portion, wherein the rotatable portion is configured to accept a portion of the electrode assembly header.

19. The method of paragraph 18, wherein the central member is configured to accept a drive barrel, wherein the drive barrel includes the electrode assembly header.

20. The method of paragraph 19, wherein the drive barrel further includes a barrel shaft that rotatably engages with the central member.

21. The method of paragraph 16, wherein one of the left member or right member includes a drive shaft, the drive shaft having a first end and a second end, the second end including a drive belt wherein the drive belt engages the barrel shaft, and the first end is configured to engage with a second drive shaft.

22. The method of paragraph 16, wherein the mandrel comprises a positive portion, a negative portion, a removable portion connecting the positive portion and the negative portion and a passage between the positive portion and the negative portion.

23. The method of paragraph 22, wherein the ligature engages the removable portion.

24. The method of paragraph 23, wherein a body portion of the ligature is configured to hold the removable portion of the mandrel.

25. The method of paragraph 24, wherein a stem of the ligature is configured to pass through a drive hole in the center portion of the shuttle.

26. The method of paragraph 24, wherein the stem of the ligature is configured to engage a winding apparatus.

27. The method of any of paragraphs 16, 17 and 21-26 wherein either the left portion, right portion or both of the shuttle are configured to accommodate an electrode strip.

28. The method of any of paragraphs 16, 17 and 21-27, wherein the left cover, right cover, or both are hinged to the shuttle.

29. The method of any of paragraphs 16, 17 and 21-28, wherein the left cover, right cover, or both comprise two or more pieces.

30. The method of any of paragraphs 16, 17 and 21-29, wherein the left cover, right cover, or both and the left portion or right portion or both of the shuttle are magnetic.

31. A coiling device for preparing an electrode assembly comprising:
   a) a winding apparatus;
   b) a platform on the coiling device configured to hold an unwound battery assembly comprising a mandrel, the mandrel including a positive portion, a negative portion and a removable portion connecting the positive portion to the negative portion and a passage in between the negative portion and the positive portion;
   c) a first spool, wherein the first spool provides a separator strip;
   d) a second spool, wherein the second spool accepts the separator strip; and
   e) one or more heating elements,
   wherein the separator strip is threaded through the passage between the positive portion and the negative portion of the mandrel.

32. The coiling device of paragraph 31, wherein the platform is dimensioned and configured to hold a base and a shuttle assembly holding an unwound battery electrode assembly.

33. The coiling device of either of paragraphs 31 or 32, wherein the platform is between the first and second spool such that the separator strip provided by the first spool bisects the platform when accepted by the second spool.

34. The coiling device of any of paragraphs 31-33, further comprising a brake system on the first spool and/or the second spool.

35. The coiling device of any of paragraphs 31-34, further comprising a tension roller between the first spool and the winding apparatus and/or a tension roller between the second spool and the winding apparatus.

36. The coiling device of paragraph 35, further comprising software to program a desired tension on the brake system.

37. The coiling device of paragraph 36, further comprising a feedback loop between the tension rollers and the brake system.

38. The coiling device of any of paragraphs 31-37, further comprising an uptake spool configured to accept a backing from the separator strip.

39. The coiling device of any of paragraphs 31-38, further comprising a winding belt attached to the winding apparatus.

40. The coiling device of paragraph 39, further comprising a drive shaft configured to be driven by the winding belt.

41. The coiling device of any of paragraphs 31-40, further comprising locking pins configured to secure a base to the platform.

42. The coiling device of any of paragraphs 31-41, wherein the coiling device is under operational control of a computer.

43. The coiling device of paragraph 42, wherein the computer comprises a human machine interface.

44. A method of making an electrode assembly comprising:
   providing a ligature, the ligature configured at a first end to secure a removable portion of a mandrel wherein the mandrel comprises a positive portion, a negative portion and a removable portion connecting the positive portion and the negative portion and including a passage between the positive portion and the negative portion;
   providing a stem on a second end of the ligature configured to pass through a drive hole in a shuttle, wherein the shuttle comprises a right portion and a left portion connected by a center portion;
   providing a positive electrode in a first portion of the shuttle so that an end of the electrode contacts the positive portion of the mandrel;
   providing a negative electrode in a second portion of the shuttle so that an end of the negative electrode contacts the negative portion of the mandrel;

welding the positive electrode to the positive portion of the mandrel and welding the negative electrode to the negative portion of the mandrel;

providing a base, the base having a right member, a left member and a central member comprising a rotating assembly;

placing an electrode assembly header in a drive barrel, the drive barrel including a drive shaft configured to mate with the rotating assembly of the base;

mating the drive shaft with the rotating assembly;

mating the shuttle with the base;

welding the electrode assembly header to the mandrel;

mounting the base, including the shuttle and the mandrel on a coiling device so that the stem of the ligature is connected to a winding apparatus;

passing a separator strip through the passage between the positive portion of the mandrel and the negative portion of the mandrel;

rotating the mandrel such that the positive electrode, separator strip and negative electrode are coiled around the mandrel; and sealing an exposed end of the separator strip to an outer layer of separator strip such that the coil is sealed, such that a coiled jelly roll electrode assembly is provided.

45. The method of paragraph 44, further comprising:

connecting a driver on the base with the winding apparatus, the driver on the base in rotatable connection with the drive barrel.

46. The method of either paragraph 44 or 45, wherein the electrode assembly header includes a battery cover and a positive feedthrough pin and a negative feedthrough pin.

47. The method of any of paragraphs 44-46, wherein the coiling device operatively links the winding apparatus with a first spool holing the separator strip and a second spool accepting the separator strip.

48. The method of paragraph 47, wherein brakes on the first spool and the second spool adjust the tension on the electrode assembly as the mandrel is rotated. Although the present invention has been described with reference to preferred embodiments, persons skilled in the art will recognize that changes may be made in form and detail without departing from the spirit and scope of the invention. All references cited throughout the specification, including those in the background, are incorporated herein in their entirety. Those skilled in the art will recognize, or be able to ascertain, using no more than routine experimentation, many equivalents to specific embodiments of the invention described specifically herein. Such equivalents are intended to be encompassed in the scope of the following claims.

What is claimed is:

1. A coiling device comprising:
a) a winding apparatus;
b) a platform on the coiling device configured to hold an unwound battery assembly comprising a mandrel, the mandrel including a positive portion, a negative portion and a removable portion connecting the positive portion to the negative portion and a passage in between the negative portion and the positive portion;
c) a first spool, wherein the first spool provides a separator strip;
d) a second spool, wherein the second spool accepts the separator strip; and
e) one or more heating elements, wherein the separator strip is threaded through the passage between the positive portion and the negative portion of the mandrel.

2. The coiling device of claim 1, wherein the platform is dimensioned and configured to hold a base and a shuttle assembly holding an unwound battery electrode assembly.

3. The coiling device of claim 1, wherein the platform is between the first and second spool such that the separator strip provided by the first spool bisects the platform when accepted by the second spool.

4. The coiling device of claim 1, further comprising a brake system on the first spool and/or the second spool.

5. The coiling device of claim 1, further comprising a tension roller between the first spool and the winding apparatus and/or a tension roller between the second spool and the winding apparatus.

6. The coiling device of claim 5, further comprising software to program a desired tension on the brake system.

7. The coiling device of claim 6, further comprising a feedback loop between the tension rollers and the brake system.

8. The coiling device of claim 1, further comprising an uptake spool configured to accept a backing from the separator strip.

9. The coiling device of claim 1, further comprising a winding belt attached to the winding apparatus.

10. The coiling device of claim 9, further comprising a drive shaft configured to be driven by the winding belt.

11. The coiling device of claim 1, further comprising locking pins configured to secure a base to the platform.

12. The coiling device of claim 1, wherein the coiling device is under operational control of a computer.

13. The coiling device of claim 12, wherein the computer comprises a human machine interface.

14. A coiling device comprising:
a) a winding apparatus;
b) a platform on the coiling device configured to hold an unwound battery assembly comprising a mandrel, the mandrel including a positive portion, a negative portion and a removable portion connecting the positive portion to the negative portion and a passage in between the negative portion and the positive portion;
c) a first spool, wherein the first spool provides a separator strip;
d) a second spool, wherein the second spool accepts the separator strip;
e) one or more heating elements;
f) a brake system on the first spool and/or the second spool; and
g) a tension roller between the first spool and the winding apparatus and/or a tension roller between the second spool and the winding apparatus;

wherein the separator strip is threaded through the passage between the positive portion and the negative portion of the mandrel, wherein the platform is dimensioned and configured to hold a base and a shuttle assembly holding an unwound battery electrode assembly and the platform is between the first and second spool such that the separator strip provided by the first spool bisects the platform when accepted by the second spool.

15. The coiling device of claim 14, further comprising an uptake spool configured to accept a backing from the separator strip.

* * * * *